US012361543B2

(12) United States Patent
Ferl et al.

(10) Patent No.: US 12,361,543 B2
(45) Date of Patent: Jul. 15, 2025

(54) AUTOMATED DETECTION OF TUMORS BASED ON IMAGE PROCESSING

(71) Applicant: Genentech, Inc., South San Francisco, CA (US)

(72) Inventors: Gregory Zelinsky Ferl, South San Francisco, CA (US); Richard Alan Duray Carano, South San Francisco, CA (US); Kai Henrik Barck, South San Francisco, CA (US); Jasmine Patil, South San Francisco, CA (US)

(73) Assignee: GENENTECH, INC., South San Francisco, CA (US)

(*) Notice: Subject to any disclaimer, the term of this patent is extended or adjusted under 35 U.S.C. 154(b) by 276 days.

(21) Appl. No.: 17/899,232

(22) Filed: Aug. 30, 2022

(65) Prior Publication Data

US 2023/0005140 A1 Jan. 5, 2023

Related U.S. Application Data

(63) Continuation of application No. PCT/US2021/021910, filed on Mar. 11, 2021.
(Continued)

(51) Int. Cl.
*G06T 7/00* (2017.01)
*G06T 7/11* (2017.01)
*G06V 10/774* (2022.01)

(52) U.S. Cl.
CPC .............. *G06T 7/0012* (2013.01); *G06T 7/11* (2017.01); *G06V 10/774* (2022.01);
(Continued)

(58) Field of Classification Search
USPC ........................................................ 382/128
See application file for complete search history.

(56) References Cited

FOREIGN PATENT DOCUMENTS

| JP | 2010017274 A | 1/2010 |
|----|--------------|--------|
| JP | 2016508398 A | 3/2016 |

(Continued)

OTHER PUBLICATIONS

Mehdi, "An integrated segmentation and shape-based classification scheme for distinguishing adenocarcinomas from granulomas on lung CT", Medical Physics, vol. 44, No. 7, May 23, 2017 (20217-05-23) (Year: 2017).*

(Continued)

*Primary Examiner* — Jacky X Zheng
(74) *Attorney, Agent, or Firm* — Kilpatrick Townsend & Stockton LLP

(57) ABSTRACT

Methods and systems disclosed herein relate generally to processing images to estimate whether at least part of a tumor is represented in the images. A computer-implemented method includes accessing an image of at least part of a biological structure of a particular subject, processing the image using a segmentation algorithm to extract a plurality of image objects depicted in the image, determining one or more structural characteristics associated with an image object of the plurality of image objects, processing the one or more structural characteristics using a trained machine-learning model to generate estimation data corresponding to an estimation of whether the image object corresponds to a lesion or tumor associated with the biological structure, and outputting the estimation data for the particular subject.

23 Claims, 26 Drawing Sheets

Related U.S. Application Data

(60) Provisional application No. 62/989,261, filed on Mar. 13, 2020.

(52) U.S. Cl.
    CPC .............. *G06T 2207/20081* (2013.01); *G06T 2207/30096* (2013.01); *G06V 2201/031* (2022.01)

(56) References Cited

FOREIGN PATENT DOCUMENTS

| | | |
|---|---|---|
| JP | 2018529443 A | 10/2018 |
| WO | 2019005722 A1 | 1/2019 |
| WO | 2019070850 A1 | 4/2019 |
| WO | 2019167884 A1 | 9/2019 |
| WO | 2021183765 A1 | 9/2021 |

OTHER PUBLICATIONS

Akram, "Automated Thresholding of Lung CT Scan for Artificial Neural Network Based Classification of Nodules", IEEE 28, Jun. 2015 (Jun. 28, 2015); (Year: 2015).*

Greg , "Murine uCT Lung Tumor Segmentation Update", Jan. 23, 2019, 13 pages.

International Application No. PCT/US2021/021910 , "International Search Report and Written Opinion", Mailed on Jul. 9, 2021, 11 pages.

Application No. PCT/US2021/021910 , International Preliminary Report on Patentability, Mailed on Sep. 22, 2022, 8 pages.

Akram et al., "Automated Thresholding of Lung CT Scan for Artificial Neural Network Based Classification of Nodules", 2015 IEEE/ACIS 14th International Conference on Computer and Information Science, Jun. 28, 2015, pp. 335-340.

Milletari, et al., V-net: Fully Convolutional Neural Networks for Volumetric Medical Image Segmentation, 2016 Fourth International Conference on 3D Vision (3DV). IEEE, 2016, found online arXiv:1606.04797v1, 11 pages.

Alilou et al., "An Integrated Segmentation and Shape Based Classification Scheme for Distinguishing Adenocarcinomas from Granulomas on Lung CT", Medical Physics, vol. 44, No. 7, May 23, 2017, 3556-3569.

Barck et al., "Quantification of Tumor Burdenin a Genetically Engineered Mouse Model of Lung Cancer by Micro-CT and Automated Analysis", Translational Oncology, vol. 8, No. 2, Apr. 2015, pp. 126-135.

Izadi, Multi-Scale Coarse-Grained Approach to Investigate Self-Association of Therapeutic Antibodies, ScienceDirect, vol. 118, Issue 11, 2020, pp. 2741-2754.

Yadav, et al., Establishing a Link Between Amino Acid Sequences and Self-Associating and Viscoelastic Behavior of Two Closely Related Monoclonal Antibodies, Pharm Res (2011) 28:1750-1764.

Kanai, et al., Reversible Self-Association of a Concentrated Monoclonal Antibody Solution Mediated by Fab-Fab Interaction that Impacts Solution Viscosity, Journal of Pharmaceutical Sciences, vol. 97, 4219-4227 (2008).

Connolly, et al., Weak Interactions Govern the Viscosity of Concentrated Antibody Solutions: High-Throughput Analysis Using the Diffusion Interaction Parameter, Biophysical Journal, vol. 103, Jul. 2012 69-78 Biophysical Journal 103, 69-78 (2012).

Ronneberger, et al., U-net: Convolutional Networks for Biomedical Image Segmentation, International Conference on Medical Image Computing and Computer-Assisted Intervention, found online arXiv:1505.04597v1, 8 pages.

Wyatt et al., "Fully-automated, High-throughput Micro-computed Tomography Analysis of Body Composition Enables Therapeutic Efficacy Monitoring in Preclinical Models", International Journal of Obesity, vol. 39, 2015, pp. 1630-1637.

JP Application No. 2022-553687, "Office Action", Feb. 12, 2025, 6 pages.

Alilou et al., "An Integrated Segmentation and Shape-based Classification Scheme For Distinguishing Adenocarcinomas from Granulomas on Lung CT", Medical Physics, vol. 44, No. 7, Jul. 2017, pp. 3556-3569.

Dhara et al., "Classification of Pulmonary Nodules in Lung CT Images Using Shape and Texture Features", Progress in Biomedical Optics and Imaging, Spie-International Society for Optical Engineering, vol. 9785, Mar. 24, 2016, 6 pages.

Padma et al., "Performance Comparison of Texture Feature Analysis Methods Using PNN Classifier for Segmentation and Classification of Brain CT Images", International Journal of Imaging Systems and Technology, vol. 26, No. 2, Jun. 2016, pp. 97-105.

* cited by examiner

AUTOMATED DETECTION OF TUMORS BASED ON IMAGE PROCESSING

CROSS-REFERENCE TO RELATED APPLICATIONS

The present application is a continuation of International Application PCT/US2021/021910, entitled "AUTOMATED DETECTION OF TUMORS BASED ON IMAGE PROCESSING" and filed Mar. 11, 2021, which claims the benefit of and priority to U.S. Provisional Patent Application 62/989,261, filed on Mar. 13, 2020, which is hereby incorporated by reference in its entirety for all purposes.

FIELD

Methods and systems disclosed herein relate generally to methods and systems for processing images to estimate whether at least part of a tumor is represented in the images.

BACKGROUND

Recent developments of medical imaging technologies have resulted in image outputs having much improved image quality. The images associated with higher quality have allowed medical practitioners to more accurately identify symptoms associated with a subject and diagnose various types of diseases. In addition, image processing systems have begun to use machine-learning techniques to gain better insight into these images. For example, a conventional approach may include using a trained machine-learning model to determine a tissue type based on features associated with the images.

Although using trained machine-learning models may assist in segmenting an image to identify image objects corresponding to tissues and/or tumors, it becomes challenging to train these machine-learning models. This is because training machine-learning models typically involves a time-consuming process of manually labeling individual images. Further, manual labeling of images may require a large number of experts to ensure accuracy. Training the machine-learning models can also be difficult when a particular set of features within training images can confound the labeling process. For example, a training image depicting a large unknown mass may obscure other features within the training image that may be relevant for diagnosis of diseases. This may subsequently frustrate the training process of the machine-learning models, either by increasing the time needed to perform the analysis or increase the error rate of the machine-learning classification.

SUMMARY

In some embodiments, a computer-implemented method includes accessing an image of at least part of a biological structure of a particular subject. In some instances, the image is a three-dimensional image depicting a part of the biological structure. The computer-implemented method can also include processing the image using a segmentation algorithm to extract a plurality of image objects depicted in the image. The computer-implemented method can also include determining one or more structural characteristics associated with an image object of the plurality of image objects. The computer-implemented method can also include processing the one or more structural characteristics using a trained machine-learning model to generate estimation data corresponding to an estimation of whether the image object corresponds to a lesion or tumor associated with the biological structure. The trained machine-learning model can be trained with a three-dimensional model constructed from a set of training images. The computer-implemented method can also include outputting the estimation data for the particular subject.

In some instances, at least part of the biological structure includes at least part of a lung. The image can depict skeletal structures surrounding at least part of the biological structure. The image can depict a transverse plane of at least part of the biological structure. The image can include or may have been derived from image data captured using a computed tomography scanner, which may be a micro-computed tomography scanner. The one or more structural characteristics can include shape, location, surface area, and/or longest diameter of the image object.

In some instances, processing the image using the segmentation algorithm includes determining one or more structural characteristics associated with another image object. Processing the image using the segmentation algorithm can also include processing the one or more structural characteristics of the other image object using the trained machine-learning model to generate estimation data corresponding to an estimation of whether the other image object corresponds a type of the biological structure. In some instances, the trained machine-learning model processes the one or more structural characteristics to identify a level of tumor burden shown in the image. Processing the image using the segmentation algorithm can also include outputting the estimation data associated with the other image object. The type of the biological structure can include blood vessel, lung, heart, and/or liver.

In some instances, the segmentation algorithm is a watershed transformation algorithm. The trained machine-learning model can be a trained support vector machine (SVM).

In some instances, the computer-implemented method includes preprocessing the image using a trained image-preprocessing machine-learning model to generate a filter. The filter can be applied to isolate one or more image regions from the image, thereby generating a filtered image. The isolated image regions may indicate the biological structure. In some instances, the trained image-preprocessing machine-learning model includes a U-Net or V-Net model. The computer-implemented method can also include processing the isolated image regions of the filtered image using the segmentation algorithm to extract the plurality of image objects depicted in the image. The trained image-preprocessing machine-learning model can be a trained convolutional-neural-network machine-learning model.

In some instances, the computer-implemented method includes processing the image using an image filter to generate a filtered image that excludes one or more skeletal structures surrounding the at least part of the biological structure. The filtered image can be used in lieu of the image to separate the image object from the plurality of image objects.

In some instances, the computer-implemented method includes processing the image using co-registration to align the image with a reference image. The aligned image can be used to in lieu of the image to extract the image object from the plurality of image objects.

In some instances, the computer-implemented method includes transforming the image into a binary image. The computer-implemented method can also include converting one or more pixels of the binary image by using a fill operation. The computer-implemented method can also include performing an erosion and dilation operation to reduce image noise from the binary image.

In some instances, processing the image using a segmentation algorithm includes applying a negative distance transform function to the image to identify boundaries between two or more overlapping image objects of the plurality of image objects.

In some embodiments, a system is provided that includes one or more data processors and a non-transitory computer readable storage medium containing instructions which, when executed on the one or more data processors, cause the one or more data processors to perform part or all of one or more methods disclosed herein.

In some embodiments, a computer-program product is provided that is tangibly embodied in a non-transitory machine-readable storage medium and that includes instructions configured to cause one or more data processors to perform part or all of one or more methods disclosed herein.

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes disclosed herein. Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification and variation of the concepts herein disclosed may be resorted to by those skilled in the art, and that such modifications and variations are considered to be within the scope of this invention as defined by the appended claims.

BRIEF DESCRIPTION OF THE DRAWINGS

The present disclosure is described in conjunction with the appended figures.

Figure 1:
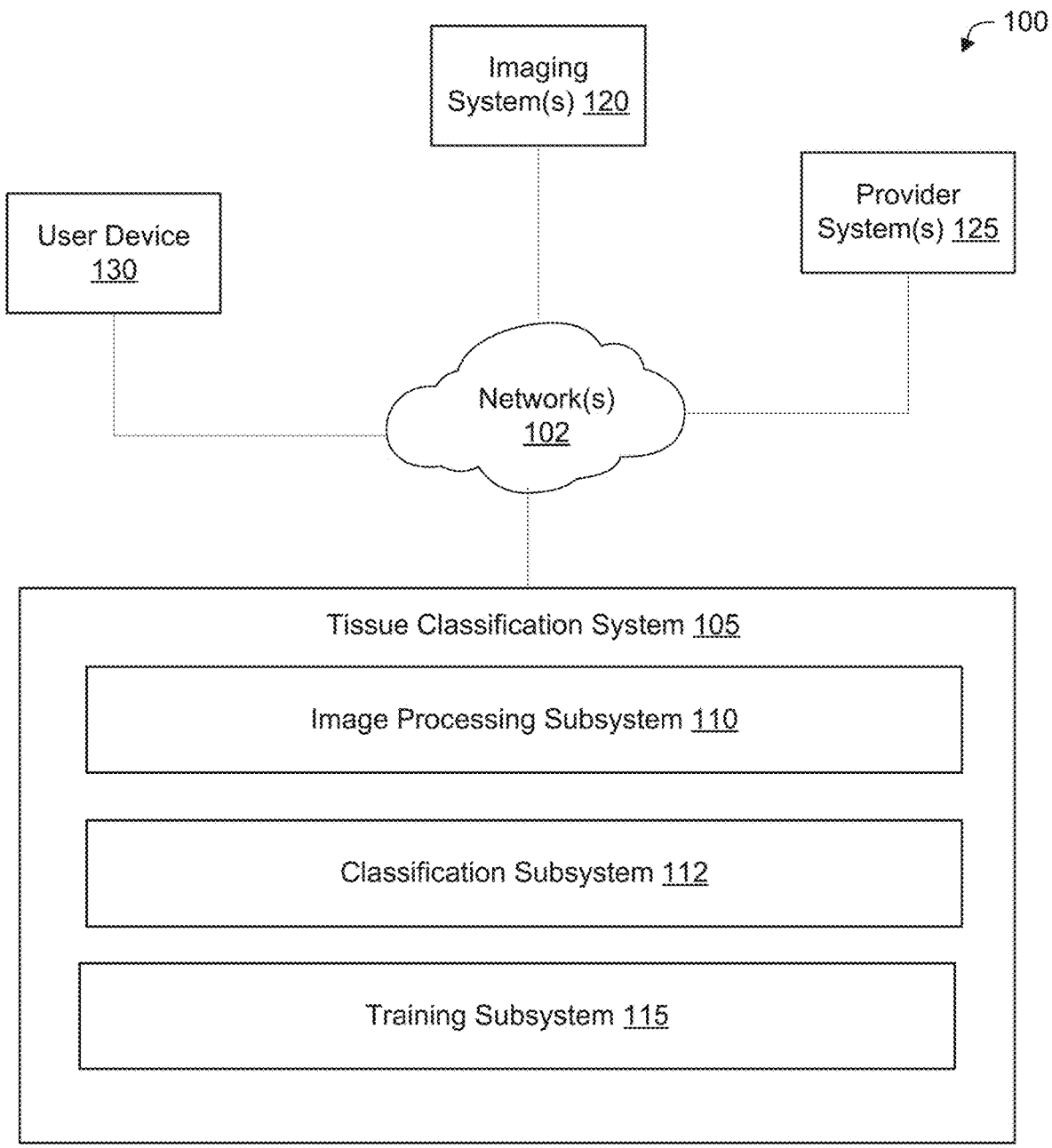
FIG. 1 illustrates an example computing environment for processing images to estimate whether at least part of a tumor is represented in the images according to some embodiments.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

I. Overview

Techniques can relate to processing images to estimate whether at least part of a tumor is represented in the images. In particular, the techniques can identify individual tumors in a three-dimensional image even when multiple tumors are present in such image. An image (e.g., a three-dimensional, micro-computed tomography (micro-CT) image) depicting a biological structure may be accessed by an image processing system. The image processing system may process the image through a series of image transformation operations, including filter operations, binarize operations, image registration operations, and segmentation operations. As a result, the image processing system can define boundaries in the image that can be used to differentiate regions of the image. Based on the identified boundaries, a set of image objects can be identified from the image. A classification system may process each image object of the extracted image objects to determine a set of structural characteristics. The set of structural characteristics can be processed using a trained machine-learning model (e.g., a support vector machine). Based on outputs from the trained machine-learning model, the classification system can identify, for each of the extracted image objects, information that indicates whether the image object corresponds to a tumor, a lesion, or a normal tissue. In some instances, the classification system processes the sets of structural characteristics to identify a level of tumor burden corresponding to the biological structure depicted in the image.

The trained machine-learning model can be trained based on training data including a set of training images. Each training image of the set may include multiple training image objects. Each training image object of the multiple training image objects may be associated with a label that identifies a biological structure corresponding to the training image object. To generate labels corresponding to the training image objects, a training system may render the three-dimensional training image into a set of two-dimensional CT images depicting slices of the biological structure, such that image objects corresponding to the three-dimensional training image can be labeled. The image can also be rendered as interactive three-dimensional image data which may include a set of three-dimensional image objects corresponding to respective portions of the biological structure. A label can be assigned for each object of the set of three-dimensional image objects, including (for example) a tumor, a heart, a liver, a lung, a mediastinum, and/or blood vessels. The training data (that includes the training images and the labels) can be used to generate sets of structural characteristics that can be used to train the machine-learning models.

The classification system can receive the trained machine-learning model from the training system. The classification system may receive an unlabeled image, from which a set of image objects can be extracted by the image processing system. For each unlabeled image object, the classification system may identify its structural characteristics. The classification system may use the trained machine-learning model to identify whether the structural characteristics of a particular image object correspond to structural characteristics associated with a particular biological structure (e.g., a tumor, a lung, blood vessels). Based on the identification, the classification system may estimate whether the particular image corresponds to a tumor, a lesion, or a normal tissue. In addition to the classification, the trained machine-learning model can identify a level of tumor burden from the image.

For example, the trained machine-learning model can predict that a given image of a particular subject includes a tumor and further predict a medium tumor burden in the given image. The trained machine-learning model can include a discriminant-analysis model, a kernel classification model, a k-nearest neighbor model, a linear classification model, a Naive Bayes classifier, a support vector machine, a gradient-boosted Ensemble classification algorithm, and/or one or more classification trees.

Accordingly, embodiments of the present disclosure provide a technical advantage over conventional systems that analyze images to detect presence of tumors in a tissue. Although conventional systems may simply identify whether any tumor is present in an image, but cannot identify types of individual tumors based on regions depicted in the image. Moreover, tumor identification by conventional systems require defining rules on image intensities, morphology and relations to other anatomical features that then need to be implemented programmatically, which is often difficult to implement. The techniques of pre-processing the images through filtering, registration, and segmentation operations can further improve the training (e.g., unsupervised training) and performance of the trained classifier systems, such that individual tumors can be identified and classified. In addition, automated generation of the three dimensional data constructed from the training data significantly improves the rate at which the training images can be processed and labeled for training the machine-learning models.

II. Techniques for Automated Detection of Tumors Based on Image Processing

II.A. Example Computing Environment

FIG. 1 illustrates an example computing environment 100 for processing images to estimate whether at least part of a tumor is represented in the images according to some embodiments. The computing environment 100 may include a tissue classification system 105, which in turn may include an image processing subsystem 110, a classification subsystem 112, and a training subsystem 115. The image processing subsystem 110 can extract image objects from an image corresponding to an individual subject, by processing the image through different types of image processing operations (e.g., automated alignments, image segmentation, and/or feature extraction). The classification subsystem 112 may process each of the extracted image objects to generate a set of structural characteristics, which in turn can be processed using a trained machine-learning model (e.g., a support vector machine). Based on outputs from the trained machine-learning model, the classification subsystem 112 can generate information corresponding to each image object, the information indicating whether the image object corresponds to a tumor, a lesion, or a normal tissue.

The image processing subsystem 110 can access an image (e.g., a three-dimensional micro-CT image) showing one or more biological structures. A biological structure may refer to one or more types of tissues that are represented in the image. For example, biological structures may include an individual organ such a lung, heart, or liver, various types of tissues (e.g., bone, blood vessels, nerves, tumors), and/or any structure that indicates changes to at least part of the biological structure (e.g., lesions). The image processing subsystem 110 may process the image using a series of image transformations to extract multiple image objects and derive structural characteristics from each of the multiple image objects.

The training subsystem 115 can train the machine-learning model and transmit it to the classification subsystem 112. The training subsystem 115 may use the training data (e.g., structural characteristics corresponding to a labeled training image object) to learn parameter values of the machine-learning model. Various machine-learning techniques may be used to train the machine-learning models. A machine-learning technique may include decision-tree learning, association-rule learning, an artificial neural network, deep learning, inductive logic programming, a support vector machine, clustering, a Bayesian network, reinforcement learning, representation learning, similarity and metric learning, sparse dictionary learning, a genetic algorithm, and/or rule-based machine learning. A machine-learning technique can include an ensemble technique, which learns inter-ensemble weights to apply to results produced from various underlying techniques (such as two or more of those previously mentioned). The inter-ensemble weights may be identified based on (for example) accuracy, speed and/or resource usage associated with the underlying techniques.

The training data can include sets of structural characteristics corresponding to image objects of training images and labels corresponding to each of the image objects. The training subsystem 115 can receive labels corresponding to each image object of the training images. The labels associated with the training data may have been received or may be derived from data received from the provider system(s) 120, each of which may be associated with (for example) a physician, lab technician, nurse, hospital, CT scan technician, etc. The training data may be generated based on communications from a medical-provider device associated with the provider system 120. The communications from the medical-provider device can include medical records corresponding to the particular subject. The medical records can include (for example) a professional's diagnosis or characterization that indicates whether at least part of a tumor is represented in the CT images.

The training subsystem 115 can also collect the labels based on three-dimensional training images. The training subsystem 115 can perform a segmentation operation (e.g., watershed segmentation, k-means) to define boundaries in the three-dimensional training image, then render the two-dimensional slice images. Based on the segmentation operation, the training subsystem 115 can define each of a set of three-dimensional image objects in the image, in which each image object corresponds to a respective portion of the biological structure. A label can be assigned for each object of the set of three-dimensional image objects. For example, each image object can be labeled as (for example) a tumor, a heart, a liver, a lung, a mediastinum, and/or blood vessels.

The training subsystem 115 may additionally or alternatively present two-dimensional slice images rendered from the three-dimensional training images, in order to facilitate the collection of labels based on the three-dimensional training images. The two-dimensional slice images correspond to consecutive and/or adjacent slices of the biological structure depicted in the training image. Each of the two-dimensional training images may include regions that were identified based on boundaries generated from the segmentation operation. Using visualizations of the two-dimensional images, labeling of the regions can be facilitated.

The labeled image objects can be processed to generate their corresponding structural characteristics. Such data can be used to train the machine-learning models. Specifically, a set of structural characteristics corresponding to each labeled training image object can be generated based on morphological features identified from the labeled training image object. For example, the set of structural characteristics may include diameter, surface area, a shape, centrally convex volume corresponding to each labeled training image object. For each labeled training image object, the set of structural characteristics can be stored in a data structure including a two-dimensional array. The data structure storing the set of structural characteristics of the image object can be inputted to train the machine-learning model, which may be trained to estimate whether an image object corresponds to a tumor based on the determined structural characteristics.

A user device 130 can be used to assign the labels to the set of three-dimensional image objects. For example, the user device 130 can include a user interface. The user interface can be used to label each of the set of three-dimensional image objects. The training subsystem 115 can avail (e.g., locally present or transmit configuration data for) the user interface of the user device 130 to represent the training image with the corresponding set of the three-dimensional image objects. As such, the three-dimensional images can be loaded into the user interface (e.g., a user interface 1000 of FIGS. 10A-C), such that the user interface may allow access of an image object of a set of image objects corresponding to each of the loaded three-dimensional images. In this manner, a user using the user device 130 may assign a tissue label (e.g., the tumor, the liver, the heart) to each image object, thereby generating training data used to train the machine-learning models.

The classification subsystem 112 can receive the trained machine-learning model from the training subsystem 115. The classification subsystem 112 may receive an input image, from which a set of unlabeled image objects can be extracted by the image processing subsystem 110. The input image may be preprocessed using a trained image-preprocessing machine-learning model to identify regions of interest (ROIs) including organs and tumors. The ROIs can be processed using binarization, registration, and segmentation (for example) to extract the set of unlabeled image objects. For each unlabeled image object, the classification subsystem 112 may identify or otherwise access its structural characteristics. The structural characteristics may refer to morphological features associated with an image object that can be measured using any techniques known to one ordinarily skilled in the art. For example, the structural characteristics may include diameter, surface area, shape, centrally convex volume, equivalent diameter, orientation, solidity, and/or volume associated with the image object. The classification subsystem 112 may use the trained machine-learning model to identify whether the structural characteristics of a particular image object correspond to pre-identified structural characteristics associated with a particular biological structure (e.g., a tumor, a lung, blood vessels). Based on the identification, the classification subsystem 112 may estimate whether the particular image corresponds to a tumor or a lesion.

At least part of the images processed by the trained machine-learning models may include or may have been derived from data collected using and received from an imaging system 120. The imaging system 120 can include a CT system, which may include a tomographic imager and/or a micro-CT component (or micro-tomosynthesis component). The tomographic imager may provide global information for determination of a region/volume of interest, extraction of the surface of the head as the reference, and assistance of local micro-tomography/local micro-tomosynthesis. The micro-CT (or micro-tomosynthesis) component may be integrated within the tomographic imager or separated from it, to acquire high-resolution data of the region/volume of interest. Based on the determined region/volume of interest, the CT system may capture the images and transmit the captured images to the tissue classification system 105.

II.B. Example Schematic Diagram of an Image Processing System

Figure 2:
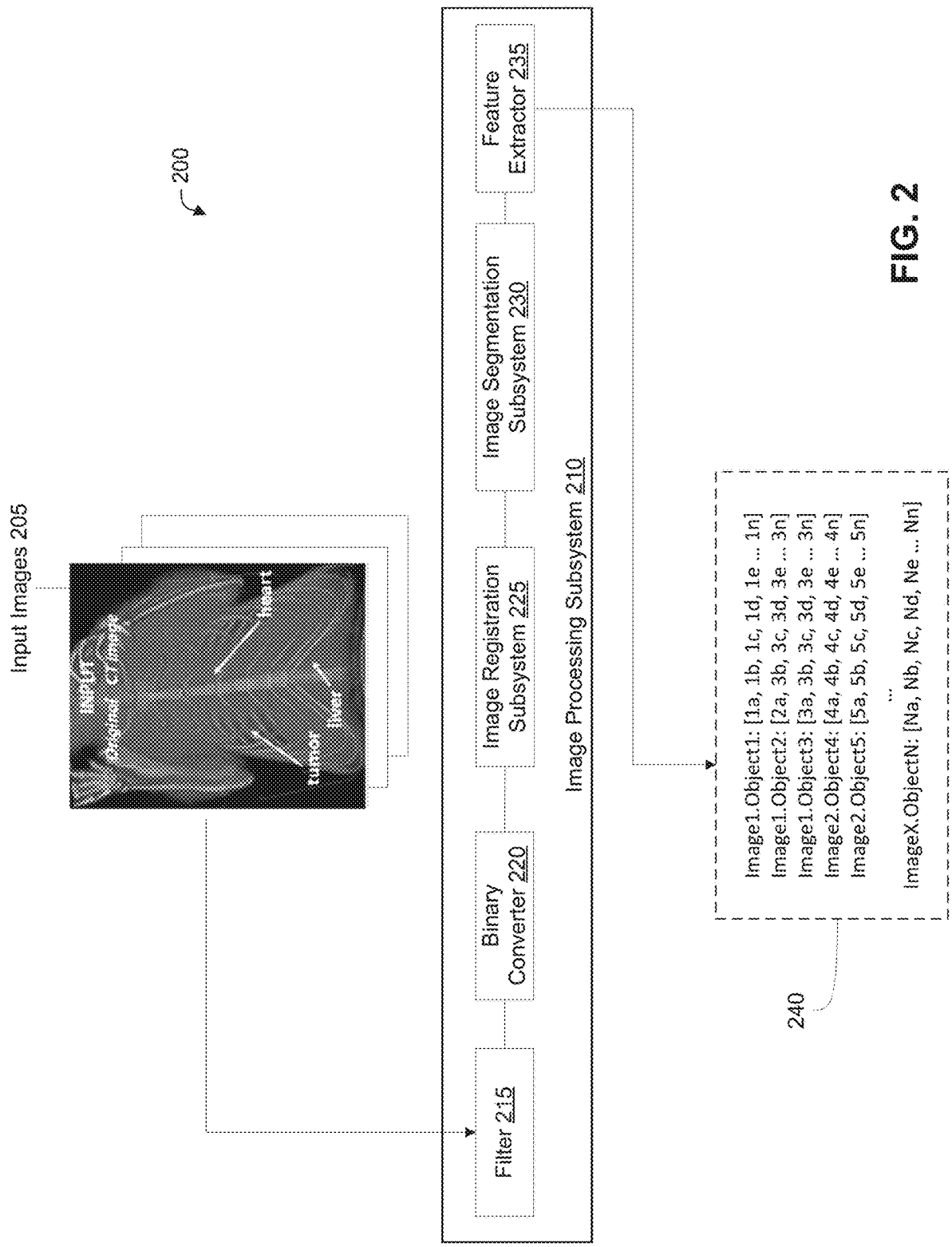
FIG. 2 illustrates an exemplary schematic diagram of an image processing system for processing images to estimate whether at least part of a tumor is represented in the images according to some embodiments.

FIG. 2 illustrates an exemplary schematic diagram 200 of an image processing system for processing images to estimate whether at least part of a tumor is represented in the images according to some embodiments. Input images 205 may be accessed by an image processing subsystem 210. The input images 205 may be three-dimensional images derived from data captured using a CT system, including a micro-CT system. Each of the input images 205 may depict a three dimensional representation corresponding to the biological structure. Each of the input images 205 may be captured at a specific point in time. For example, an input image of the input images 205 may be captured at a time point at which no lesions or tumors are detected. Another input image of the input images 205 can be captured at another time point at which the lesions or tumors are visible in the image. The input images 205 may or may not be captured using a respiratory gating operation. For example, an imaging system (e.g., the imaging system 130 of FIG. 1) can use the respiratory gating operation to identify a specific phase (e.g., inhale, exhale) of the subject's respiratory cycle. The imaging system may then capture each of the input images 205 during a particular phase that corresponds to the pre-identified phase. In some instances, the input images 205 are images depicting ROIs, in which an image region depicting the biological structure including heart, lung, and tumor is cropped from an original input image.

Filters can be applied to each of the input images 205 to produce the filtered images. A first filter may be applied to each of the input images 205 to isolate a biological structure of interest from the image. In some instances, the first filter includes an image mask (e.g., a lung mask) specifically used to isolate a particular biological structure (e.g., the lung). Additionally or alternatively, the first filter can include another type of image mask (e.g., a thoracic-cavity mask) that can be used to isolate multiple biological structures of interest (e.g., the lung, heart, liver, mediastinum, tumor, blood vessels). A second filter may be additionally used for each of the input images to identify particular skeletal structures appearing in the input image. Image portions corresponding to the particular skeletal structures can be removed from each of the input images 205. The identified skeletal structures can be alternatively used as boundaries surrounding the biological structure, at which the boundaries can be used to adjust the size of a region corresponding to the biological structure of interest.

In some instances, a trained image-preprocessing machine-learning model is applied to the input image to generate the filters 215. For example, a trained V-Net can be used to process the input image to identify the biological structure of interest (e.g., the heart). In another example, a trained U-Net can be used to process the input image to identify the biological structure of interest. The trained image-preprocessing model can thus be used to generate one or more filters (e.g., a lung mask), to isolate the biological structure (e.g., the lung) from other regions of the input image (e.g., rib cage, blood vessels).

A binary converter 220 may transform the filtered images into binary images. The binary converter 220 may convert each pixel of at least part of a filtered image into either 0 or 1 pixel value. For example, the filtered image can be a grayscale image, which can be converted into the binary image by the binary converter 220. The binary converter 220 may additionally convert binary values corresponding to a subset of pixels (e.g., 0 pixel surrounded by 1 pixels) in the binary images based on a fill operation. The binary converter 220 may thus remove background signals and image objects in the filtered image. In effect, by transforming the filtered images into binary images, borders surrounding each image object can be sharpened and may thus generate an output that is optimized for subsequent image processing operations. For example, image registration operations may better align the images as a result of the transformation. This is because the binary images with sharpened borders can be properly aligned with those of a reference image. In another example, the generation of binary images can allow image segmentation algorithms to produce a more accurate set of image objects, due to the image objects being more clearly defined based on their sharpened borders. Erosion-dilation operations can be applied to further reduce image noise of the binary images. In some instances, the binary converter 220 transforms the filtered images into the binary images after a registration operation is performed.

An image registration subsystem 225 can process the binary images using an image registration operation to produce registered images. The image registration operation (e.g., rotation, scale, translation, shear) may include associating the binary images to a reference image, in order to align the binary images into a single spatial coordinate system. Because the registered images are aligned in the single spatial coordinate system, the subsequent operations (e.g., an image segmentation algorithm) may use similar location parameters (e.g., x, y, and z coordinates) for the set. Further, training machine-learning models with registered images may result in an increase of accuracy during deployment. Otherwise, a location of each image object being expressed by x, y, and z coordinates may correspond differently from one image to another, unless all images are registered within the same coordinate system. The image registration subsystem 225 may register the binary images using a reference filter to derive transformation parameters from the filtered images. For example, the bone mask filter of a reference image can be used as the reference filter which can be applied to bone mask filters corresponding to the set of filtered images. As a result, a first set of transformation parameters (e.g., tform) can be identified. For each of the binary images, the first set of transformation parameters can be applied by the image registration subsystem 225 such that the binary images can be warped towards the location coordinates corresponding to the bone mask filter. The filtered images can be warped using the first set of transformation parameters as well, such that they can be used to generate additional sets of transformation parameters.

The image registration subsystem 225 may additionally apply a second registration operation to the warped images (e.g., warped images based on the first set of transformation parameters) using the reference image. Each of the warped filtered images can be aligned by the image registration subsystem 225 to corresponding regions of the reference image. Once the alignment is completed, a second set of transformation parameters can be identified (e.g., tform_grayscale). The warped images generated based on the reference filter can be warped again using the second set of transformation parameters to produce the registered images. The second registration operation using the reference image can allow the registered images to be further calibrated towards the single coordinate system, such that training of the machine-learning models as well as other image processing operations can become more efficient.

An image segmentation subsystem 230 can process the registered images using a segmentation algorithm to extract image objects corresponding to each registered image. The segmentation algorithm can enable identification of morphological features of each of the registered images and by defining boundaries of the image objects by using the morphological features. The image segmentation subsystem 230 can use the identified boundaries to extract each image object from the registered image. Various techniques can be used to extract the image objects from the registered images, including watershed segmentation algorithms, graph partitioning algorithms, and model-based segmentation algorithms.

For each image object of the extracted image objects, a feature extractor 235 may identify its structural characteristics. The feature extractor 235 may identify other types of characteristics from each of the image objects including, but not limited to, location coordinates of the center of mass of the image object, Eigenvalues associated with the voxels forming the image object, and Euler angles associated with the image object.

II.C. Example Schematic Diagram of Applying Image Filters to Input Images

As described herein, filters can be applied to each of the input images to produce the filtered images. A first filter may be applied to each of the input images to isolate a biological structure of interest from the image. A trained U-Net (for example) can be used to generate the first filter, such that a particular organ such as the lung can be identified and isolated. In some instances, the first filter includes an image mask (e.g., a lung mask) specifically used to isolate a particular biological structure (e.g., the lung). Additionally or alternatively, the first filter can include another type of image mask (e.g., a thoracic-cavity mask) that can be used to isolate multiple biological structures of interest (e.g., the lung, heart, liver, mediastinum, tumor, blood vessels). A second filter may be additionally used for each of the input images to identify particular skeletal structures appearing in the input image. Image portions corresponding to the particular skeletal structures can be removed from each of the input images. The identified skeletal structures can be alternatively used as boundaries surrounding the biological structure, at which the boundaries can be used to adjust the size of a region corresponding to the biological structure of interest.

II.C.1 Generating Image Filters Using Image-Preprocessing Machine-Learning Models In some embodiments, a trained image-preprocessing machine-learning model is used to process each input image to generate one or more filters, in which the filters can be used to identify organs, tissues, tumors, and blood vessels depicted in the input image. The trained machine-learning model may additionally or alternatively be used for organ-specific identification for one or more organs such as the spleen, liver, lungs, and kidneys. Based on the identification, the generated filters can be applied to each of the input images, such that subsequent image processing can be focused on image regions corresponding to ROIs identified by the filters.

II.C.1.a Example Training Data Set for Training the Image Preprocessing Machine-Learning Model The image-preprocessing machine-learning model can be trained using a training data set that includes a plurality of training images. The training images correspond to images, in which ROIs corresponding to the biological structure were identified. In some instances, an ROI of a training image is identified as follows: (i) a technician marks multiple 2-dimensional regions that correspond to the biological structure (e.g., the lungs); (ii) the 2-dimensional regions are propagated into a continuous 3-dimensional ROI; (iii) the 3-dimensional ROI is segmented from the training image; and (iv) tissue volume is calculated from the 3-dimensional ROI. An example training data set can include 3520 CT scans with lung ROIs, in which a subset of the training images can be discarded in which the ROIs are not accurately identified (e.g., missing ROI, corrupted file, inaccurate identification of the biological structure).

II.C.1.b Generating Image Filters Using U-Net

Figure 3:
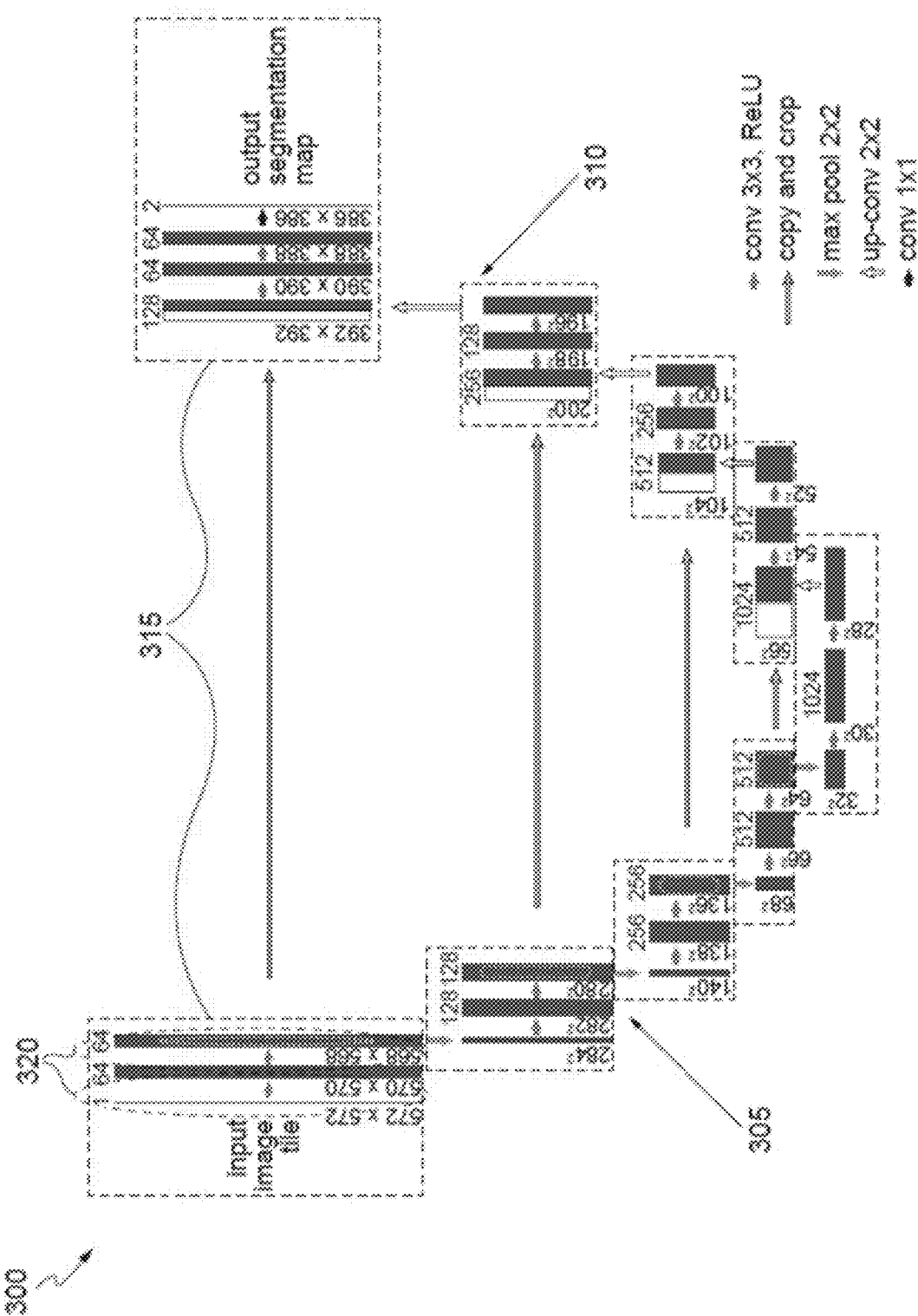
FIG. 3 shows an exemplary U-Net according to some embodiments.

The three-dimensional training images can be used to train the machine-learning model (e.g., a U-Net), which in turn can generate the filters for identifying biological structures of interest. As shown in FIG. 3, a U-Net 300 may include a contracting path 305 and an expansive path 310, which gives it a u-shaped architecture. The contracting path 305 is a CNN network that includes repeated application of convolutions (e.g., 3×3 convolutions (unpadded convolutions)), each followed by a rectified linear unit (ReLU) and a max pooling operation (e.g., a 2×2 max pooling with stride 2) for downsampling. At each downsampling step or pooling operation, the number of feature channels may be doubled. During the contraction, the spatial information of the image data is reduced while feature information is increased. The expansive path 310 is a CNN network that combines the feature and spatial information from the contracting path 305 (upsampling of the feature map from the contracting path 305). The upsampling of the feature map is followed by a sequence of up-convolutions (upsampling operators) that halves the number of channels, concatenations with a correspondingly cropped feature map from the contracting path 305, repeated application of convolutions (e.g., two 3×3 convolutions) that are each followed by a rectified linear unit (ReLU), and a final convolution (e.g., one 1×1 convolution) to generate the two-dimensional tumor masks. In order to localize, the high-resolution features from the contracting path 305 are combined with the upsampled output from the expansive path 310. The U-Net 300 uses the valid part of each convolution without any fully connected layers, i.e., the segmentation map only contains the pixels for which the full context is available in the input image, and uses skip connections that link the context features learned during a contracting block and the localization features learned in an expansion block.

Figure 4A:
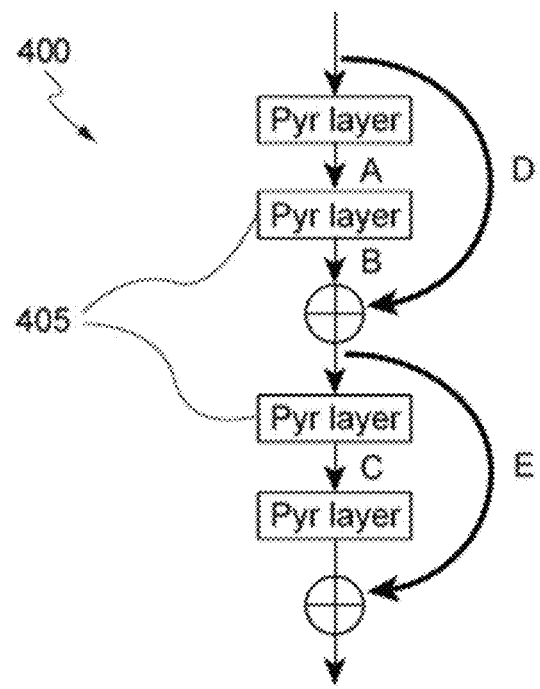
FIG. 4A shows a residual block according to some embodiments.

In conventional U-Net architecture, convolutional blocks are composed of convolutional layers (e.g., typically two or three layers) for performing the convolutions. However, in accordance with various embodiments, the convolutional blocks and convolutional layers are replaced with residual blocks 315 with separable convolutions performed in pyramidal layers 320 (a single convolutional layer may be replaced with two or more pyramidal layers 320) at one or more levels of dilation. (e.g., stacked filtered images). FIG. 4A illustrates the layer structure of one of the residual blocks 315 illustrated in FIG. 3. As shown, a residual block 400 may comprise multiple pyramidal layers 405. In a network (e.g., a ResNet) comprising residual blocks 400, each pyramidal layer 405 feeds into the next layer (A, B, C ... ) and directly into the layers about 2-3 layers away (D, E ... ). The use of residual blocks 400 in the network helps to overcome a degradation problem that occurs from increasing the number of pyramidal layers (if the number of layers keeps increasing, accuracy will increase at first but will start to saturate at one point and eventually degrade). The residual blocks 400 skip some of these additional pyramidal layers using the skip-connections or residual connections, which ultimately propagates larger gradients to initial pyramidal layers. Skipping effectively simplifies the network, using fewer pyramidal layers in the initial training stages. This speeds learning by reducing the impact of vanishing gradients, as there are fewer layers to propagate through (i.e., multi-speed residual learning). The network then gradually restores the skipped layers as it learns the feature space.

Figure 4B:
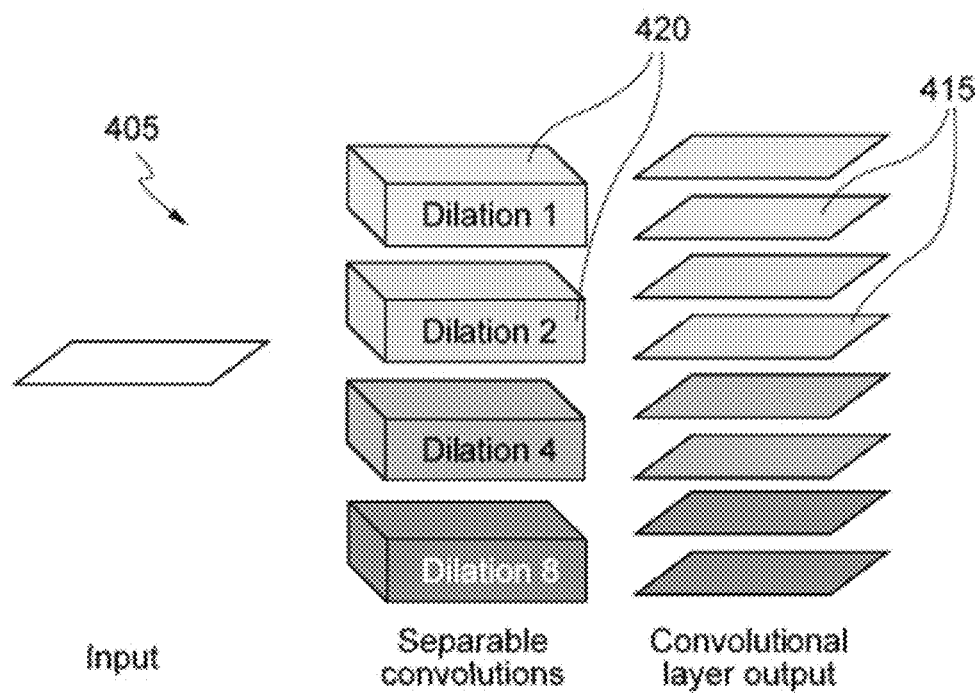
FIG. 4B shows a pyramidal layer according to some embodiments.

FIG. 4B illustrates a single pyramidal layer 405 of FIG. 4A, in accordance with various embodiments. As shown in FIG. 4B, the pyramidal layer 405 may use dilated (atrous) separable convolutions at multiple different scales ('dilation blocks'), in this example four levels. The pyramidal layer 405 comprises the same image at the multiple different scales in order to increase accuracy in detecting objects (e.g., a tumor). A dilated (atrous) convolution refers to a filter with a "spread out" receptive field, which increases the size of the receptive field relative to the kernel size. In some embodiments, the one or more levels of dilation is four levels of dilation. In other embodiments, greater or fewer levels of dilation could be used, for example, six levels of dilation. The convolutional layer output 415 are output of the dilation blocks 420 (here labeled as Dilations 1, 2, 4, and 8). The illustrated example of FIG. 4B assumes four dilation blocks and that each dilation block outputs two channels (of the same color), so the total number of channels output is eight. The number of channels output by each dilation block may vary depending on the residual block in question. The example of FIG. 4B illustrates the top left or top right residual block 315 in FIG. 3. In some embodiments, the number of each of the channels output by each dilation block 415 in a pyramidal layer 410 of a residual block 405 is equal to the k number of filters on the residual block 405 divided by four.

Empirical evidence shows that the residual blocks allow a gain of accuracy and an easier optimization. Separable convolutions, depthwise convolutions followed by pointwise convolutions, have also shown a large gain in convergence speed and a significant reduction of the model size. Dilated convolutions expand the receptive field without loss of resolution allowing hence to aggregate multi-scale contextual information down sampling. The redesign of the convolutional blocks allows for extracting very localized and rare information in the image.

II.C.1.c Generating Image Filters Using V-Nets

A model (e.g., a three-dimensional convolutional neural network such as a V-Net for three-dimensional segmentation) may comprise downsampling and upsampling subnetworks, with skip connections to propagate higher resolution information to the final segmentation. In some instances, the downsampling subnetwork may be a sequence of multiple dense feature stacks connected by downsampling convolutions, each skip connection may be a single convolution of the corresponding dense feature stack output, and the upsampling network comprises bilinear upsampling to the final segmentation resolution.

Figure 5:
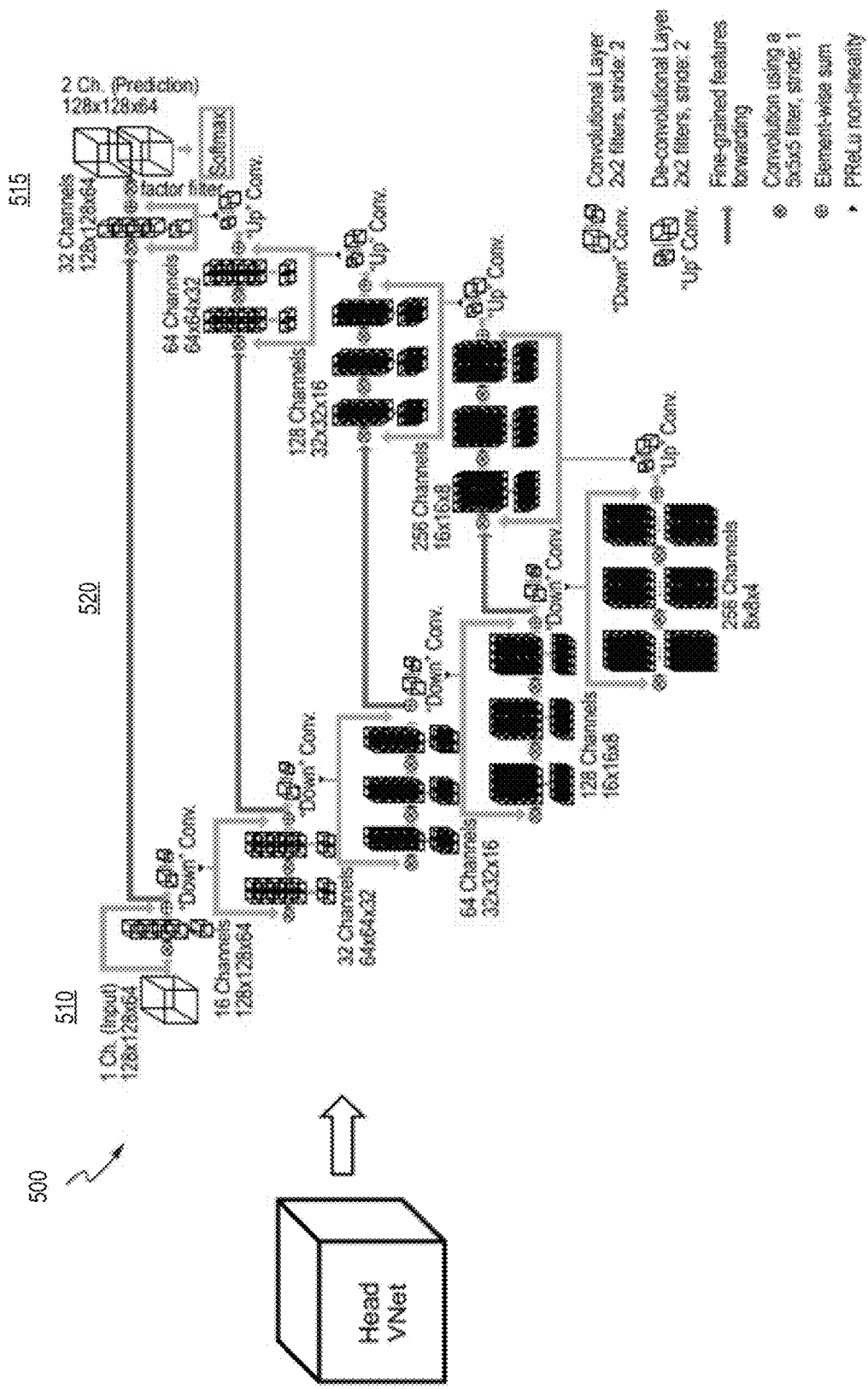
FIG. 5 illustrates an example schematic diagram of a –V-Net architecture used for image-preprocessing according to some embodiments.

The trained image pre-processing machine-learning model can be used to extract features from the input image (e.g., micro-CT image) using a convolutional neural network (CNN) system that includes multiple distinct submodels to identify the ROIs in the image. As shown in FIG. 5, a trained V-Net 500 may be used to refine the input image. The trained V-Net 500 can perform a series of operations that form a single convolutional layer for several types of CNN architecture elements: (1) convolution; (2) non-linearity conversion (e.g., ReLU); (3) pooling or sub sampling; and (4) classification (Fully Connected Layer). In some instances, convolution operation of the trained V-Net 500 preserves the spatial relationship between pixels or voxels within at least one of the two-dimensional or three-dimensional scans or across two-dimensional or three-dimensional scans by learning image features using small squares of input data. For example, the input image can be considered as a matrix of pixel and voxel values, in which each pixel and voxel area of the matrix can be assigned with values. In addition, the input image can include black-and-white images having pixel or voxel values ranging from 0 and 1. The input image may alternatively or additionally include color images that have three assigned RGB pixel or voxel values ranging from 0 and 255.

After the input image is accessed, the trained V-Net 500 may perform convolutions on the input image to extract features corresponding to anatomical regions depicted in the image. The left side of the trained V-Net 500 may include a compression path 510 for downsampling, and the right side may include a decompression path 515 for upsampling that decompresses the signal until its original size is reached. The compression path 510 may be divided in different stages that operate at different resolutions. Each stage may comprise one or multiple convolutional layers. Convolutions within each of the layers may be applied with appropriate padding. Each stage may be configured such that it learns a residual function via a residual connection: the input of each stage is (i) used in the convolutional layers and processed through the non-linearities, and (ii) added to the output of the last convolutional layer of that stage in order to enable learning a residual function. The convolutions performed in each stage use volumetric kernels having a predetermined size such as 5×5×5 voxels. As the data proceeds through different stages along the compression path 510, its resolution may be reduced. Each stage along the compression path 510 can be performed through convolution with predetermined size kernels such as 2×2×2 voxel wide kernels applied with an appropriate stride (e.g., a slide of 2). Since the second operation extracts features by considering only non-overlapping volume patches, the size of the resulting feature maps can be halved (sub-sampled). This strategy can serve a similar purpose as pooling layers. Replacing pooling operations with convolutional ones can result in a network with a smaller memory footprint, because no switches mapping the output of pooling layers back to their inputs are needed for back-propagation. Each of the stages of the compression path 510 may compute a number of features which is multiple times higher than the number of feature from the previous layer.

The decompression path 515 can extract features and expands the spatial support of the lower resolution feature maps in order to gather and assemble the necessary information to output a two channel volumetric segmentation corresponding to the ROIs of the image. After each stage of the decompression path 515, a de-convolution operation may be employed in order increase the size of the inputs followed by one or multiple convolutional layers involving half the number of kernels such as 5×5×5 kernels employed in the previous layer. Similar to the compression path 510, residual functions may be learned in the convolutional stages of decompression path 515. Additionally, the features extracted from early stages of the compression path 510 may be forwarded to the decompression path 515, as shown by the horizontal connections 520. The two feature maps computed by the very last convolutional layer, having an appropriate kernel size such as 1×1×1 kernel size and producing outputs of the same size as the input volume (two volumes having the same resolution as the original input data), may be processed through a soft-max layer which outputs the probability of each voxel belonging to foreground and to background max voxelwise. Based on the probability outputted by the softmax layer, the trained image pre-processing machine-learning model can indicate a probability as to whether a particular voxel corresponds to an image region of the ROIs. Accordingly, the outputs generated by the trained V-Net 500 for all voxels in the input image may indicate multiple image regions corresponding to the ROIs, which may include a tissue, blood vessels, a tumor, and a mediastinum.

After the ROIs are identified, the ROIs can be used to generate the filters for isolating the biological structure from the input images. The use of the trained image pre-processing machine-learning model may improve accuracy of classification of images, since only relevant portions of the image are being classified.

II.C.1.d Example Results

Figure 6:
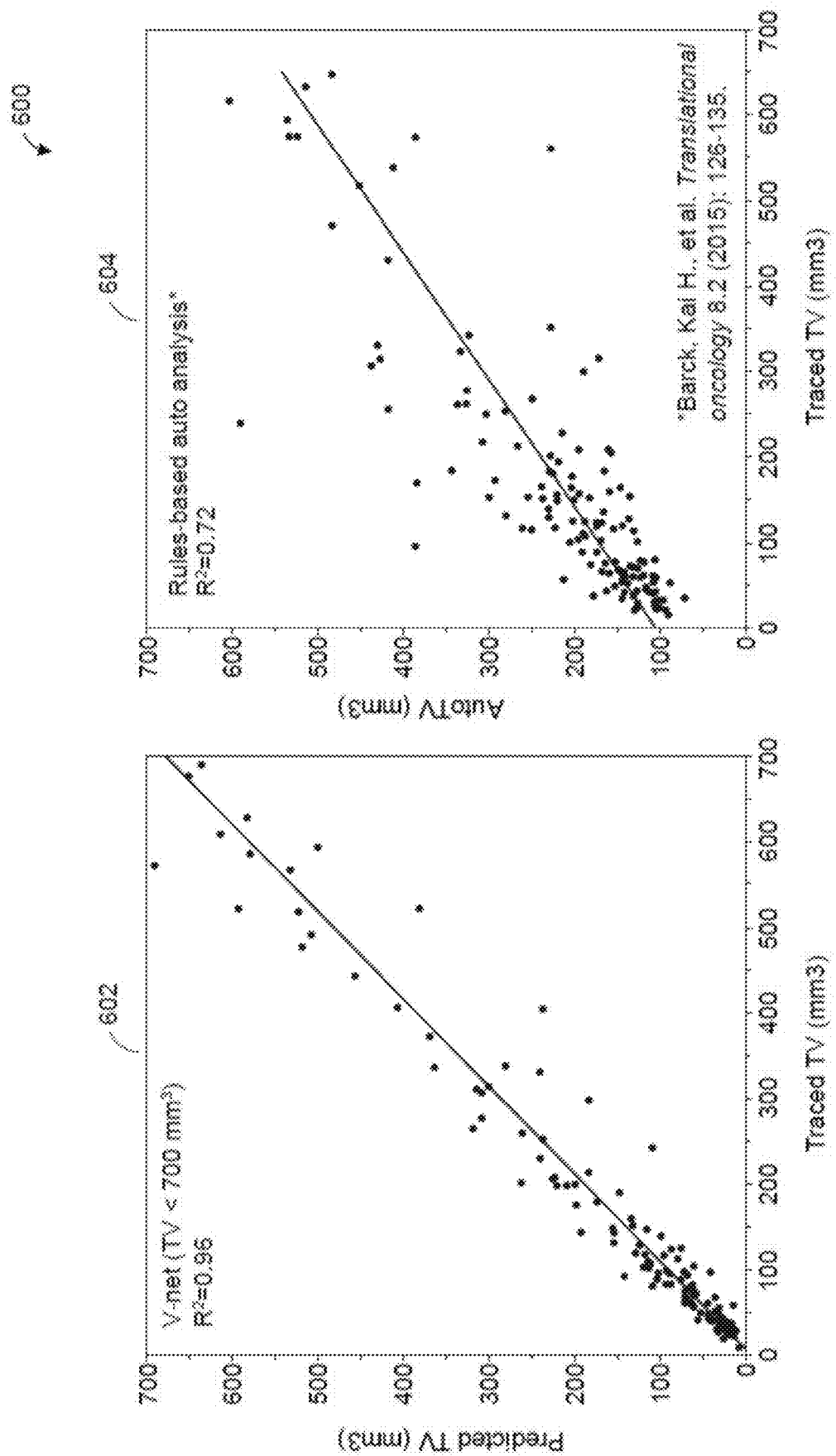
FIG. 6 shows an example set of graphs that indicate performance of the trained image-preprocessing machine-learning model.

FIG. 6 shows an example set of graphs 600 that indicate performance of the trained image-preprocessing machine-learning model. In a linear regression graph 602, each plot point represents, for a corresponding image, an amount of tissue volume identified manually by tracing the image (x-axis) and an amount of tissue volume detected by a trained V-Net (y-axis). In the graph 602, the coefficient of determination (R2) is 0.96, which demonstrates accuracy of the V-Net in detecting tissue volumes across images that include different amounts of tissue volume.

In a linear regression graph 604, each plot point represents, for a corresponding image, an amount of tissue volume identified manually by tracing the image (x-axis) and an amount of tissue volume detected the image by a rules-based analysis (y-axis). For this example, the rules-based analysis is implemented using techniques discussed in Barck, Kai H et al. "Quantification of Tumor Burden in a Genetically Engineered Mouse Model of Lung Cancer by Micro-CT and Automated Analysis." Translational oncology vol. 8,2 (2015): 126-35. In the graph 604, the coefficient of determination (R2) is 0.72. Using the manually-traced tissue volume as a point of reference, the trained V-Net detected tissue volumes more accurately than the tissue volumes detected by the rules-based analysis. Such accuracy can indicate an improved performance of V-Nets in generating filters for isolating the tissue (e.g., the lungs) from the corresponding images.

II.C.2 Applying Image Filters

Figure 7A:
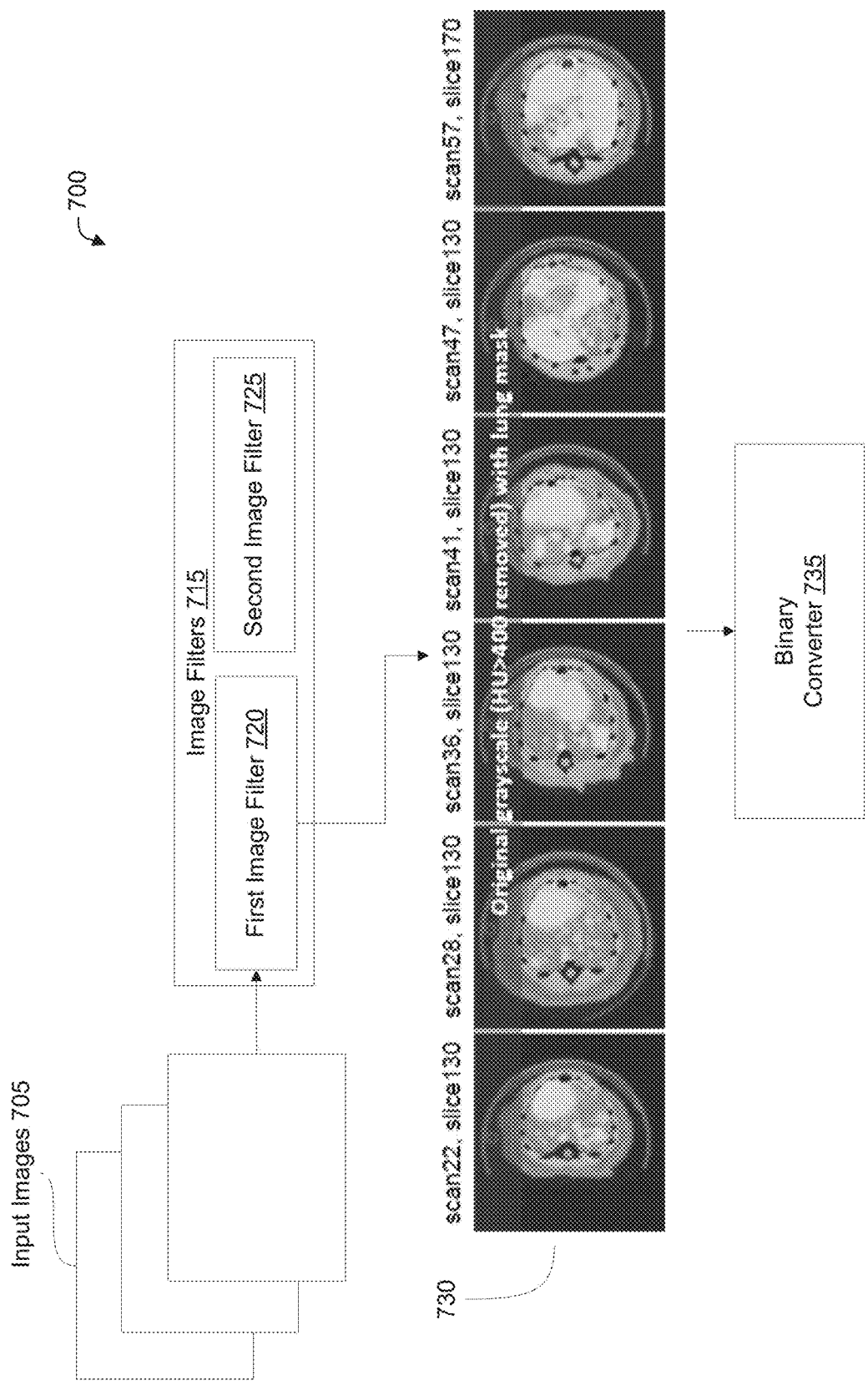
FIGS. 7A-B illustrate exemplary schematic diagrams of image filter subsystems that identify biological structures from input images according to some embodiments.
Figure 7B:
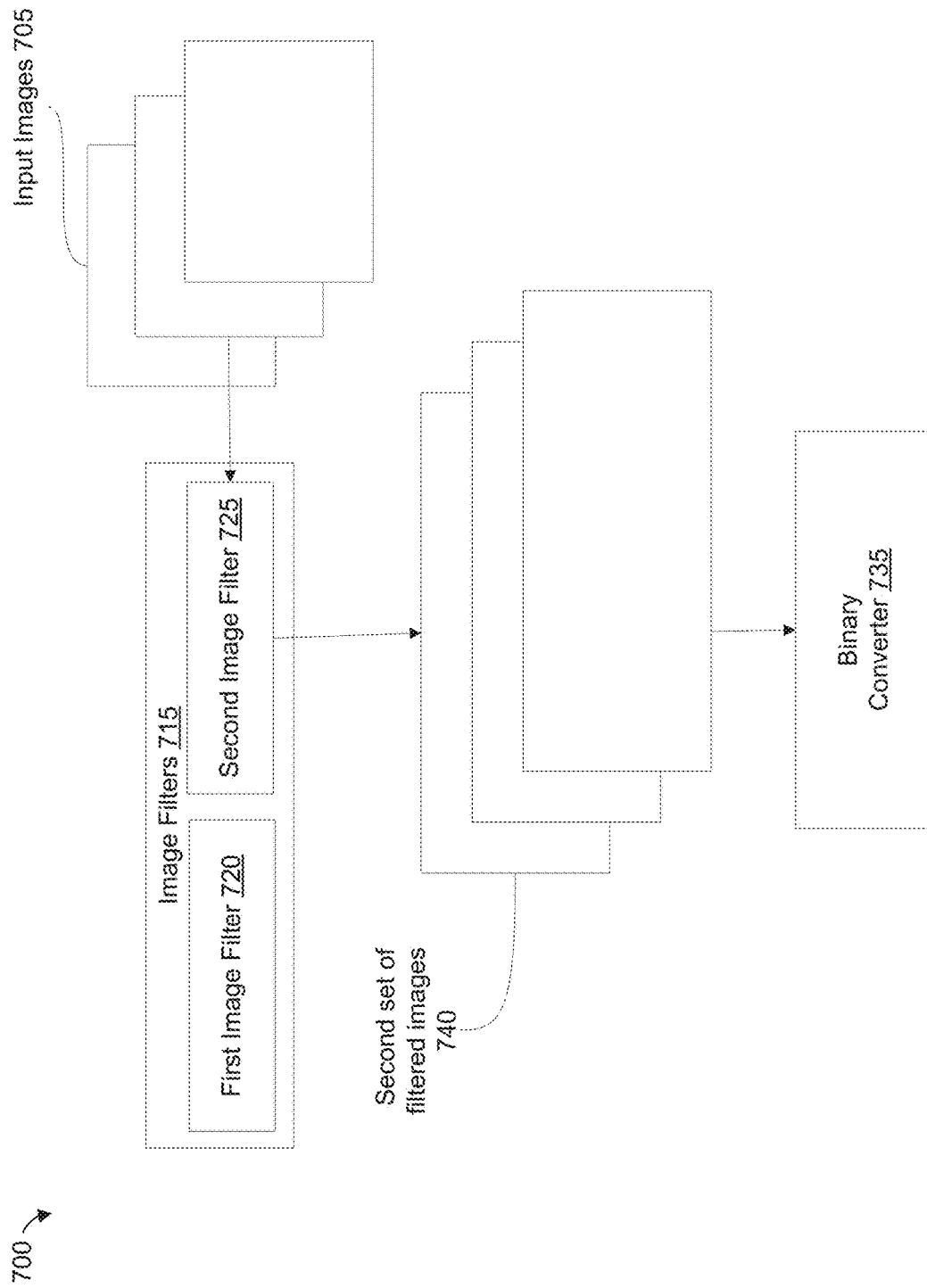

FIGS. 7A-B illustrate exemplary schematic diagrams 700 of image filter subsystems that identify biological structures from input images according to some embodiments. Image filters 715 of an image processing system (e.g., the image processing system 310 of FIG. 3) can access a set of input images 705 that depict a biological structure of a subject (e.g., an organ, blood vessels, a tumor). For each of the set of input images 705, the image filters 715 may apply image masks and generate a set of filtered images. Each of the generated filtered images depicts the biological structure of interest (e.g., the lung) being distinguished from background portions of the input image.

In FIG. 7A, a first image filter 720 may generate a first set of image masks corresponding to the set of input images 705. In each image mask of the first set of image masks, the first image filter 720 can specify one or more biological structures that can be identified in the image, while image regions that do not correspond to the specified biological structures (e.g., the background portions) can be obscured or removed. The first image filter 720 may apply each generated image mask of the first set of image masks to each of the input images 705. By applying the first set of image masks on the set of input images 705, the first image filter 720 may generate a first set of filtered images 730. For each filtered image in the set of filtered images, at least a part of the filtered image (e.g., the lung, thoracic cavity) can be distinguished from other portions the filtered image (e.g., the rib cage, air). Additional details regarding the use of the image masking operations to identify the biological structures as disclosed herein are set forth in Barck K H, et al. "Quantification of Tumor Burden in a Genetically Engineered Mouse Model of Lung Cancer by Micro-CT and Automated Analysis." Transl Oncol. 2015; 8:126-135 and Wyatt S K, et al. "Fully-automated, high-throughput micro-computed tomography analysis of body composition enables therapeutic efficacy monitoring in preclinical models." Int J Obes (Lond). June 2015, which are both incorporated herein by reference in their entirety for all purposes.

In FIG. 7B, a second image filter 725 may also process each of the set of input images 705 to generate a second set of image masks. By using the second image mask, the second image filter 725 can generate a second set of filtered images 740. For each of the second set of filtered images 740, different parts of the filtered image can be identified for removal. For example, a filtered image of the second set of filtered images 740 can indicate image regions corresponding to the particular skeletal structures which can removed, whereas other portions of the filtered image remain (e.g., the lung). The first image filter 720 can also use the second set of image masks to draw boundaries that define the biological structure of interest (e.g., the lung) and generate the first set of filtered images 735, such that image regions outside the boundaries can be removed. The second set of filtered images can be transmitted to a binary converter subsystem 735.

Figure 8:
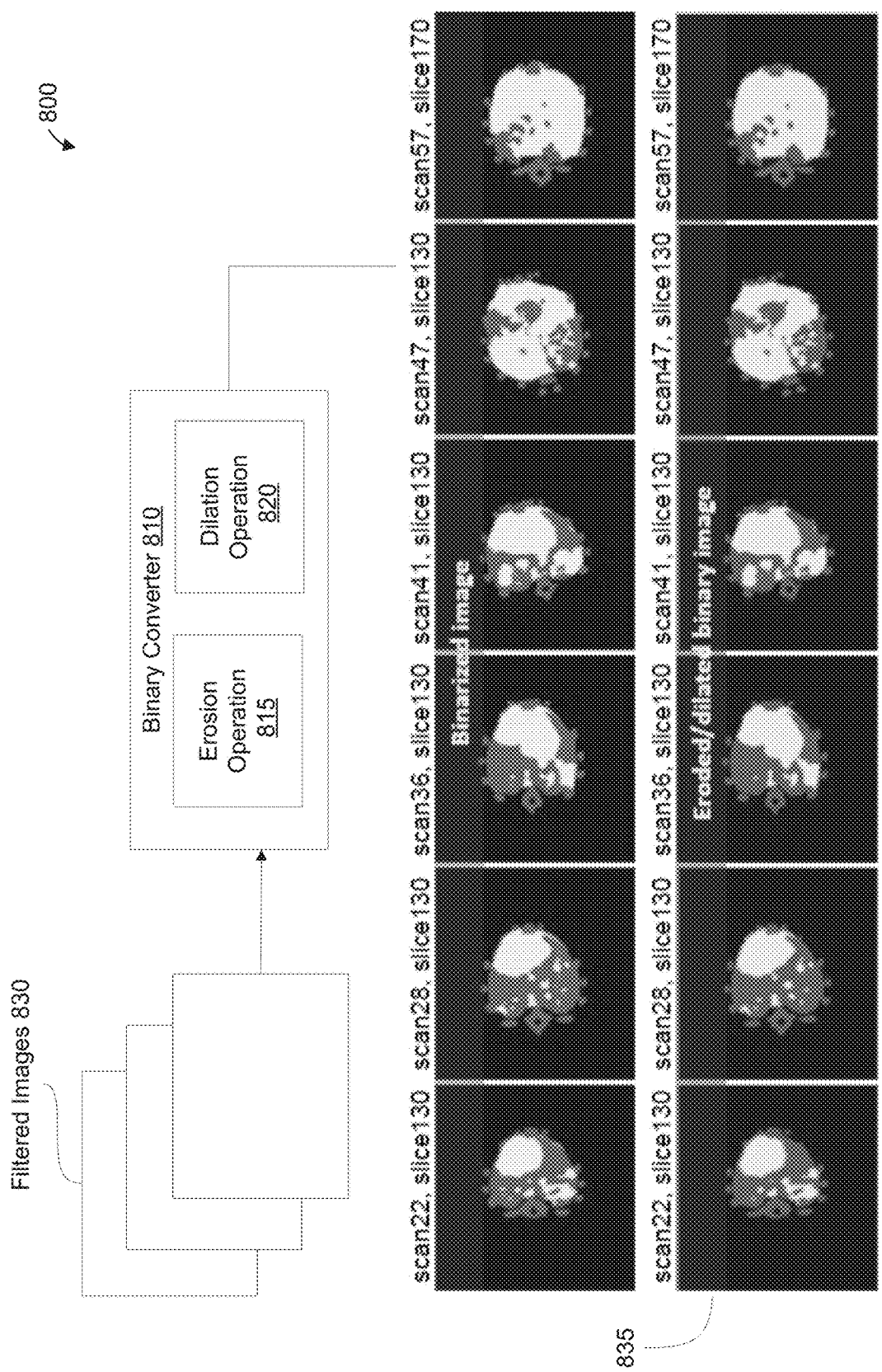
FIG. 8 illustrates an example schematic diagram of a binary converter subsystem that transforms the filtered images into binary images according to some embodiments.

II.E. Example Schematic Diagram of a Binary Converter of an Image Processing System FIG. 8 illustrates an example schematic diagram 800 of a binary converter subsystem that transforms the filtered images into binary images according to some embodiments. A binary converter subsystem 810 (e.g., the binary converter subsystem 835 of FIG. 8) can access a set of filtered images 830 which were outputted from image filters (e.g., the image filters 815 of FIG. 8). The binary converter subsystem 810 can binarize each pixel of each filtered image of the filtered images 830 based on the pixel's corresponding radiodensity value. For example, a pixel associated with an HU above a determined threshold can be configured as 1 pixel value, and another pixel associated with an HU below the threshold can be configured as 0 pixel value. The binary converter subsystem 810 can use a binarize operation, in which a threshold range can be determined so as to minimize variance of the black and white pixels. For example, the binary converter subsystem 810 can set the threshold range between −200 HU and 400 HU, at which any pixels associated with the HU outside of the threshold range can be converted into the 0 pixel value. As a result, a set of binary images 835 can be outputted in which pixel values of each binary image are configured as either 1 or 0.

The binary converter subsystem 810 may additionally perform a fill operation for each of the set of binary images 835 to remove holes within a region of the image. For example, the binary image can include a group of pixels having 0 values (e.g., hole) that are enclosed by a larger group of pixels having 1 values (e.g., region surrounding the hole). The binary converter system can perform the fill operation on the group of 0-value pixels to output a new binary image in which the two groups of pixels are merged into a new group of pixels having 1 values (e.g., region without holes).

Each of the set of binary images 835 can additionally be processed through an erosion operation 815 and/or a dilation operation 820. By performing the erosion operation 815 and the dilation operation 820, small image objects that cannot be accurately classified can be removed from each binary image of the set of binary images 835. Removing smaller image objects from classification can improve performance of subsequent segmentation operations. The erosion operation 815 may access a binary image of the set of binary images and initialize an image-processing kernel (e.g., 5×5 kernel) at a first pixel within the binary image. As the image-processing kernel traverses through each pixel of the binary image, a pixel with a value of 1 (e.g., white) may be converted into 0 (e.g., black) if at least one neighboring pixel covered by the kernel has a value of 0. In effect, the erosion operation 815 erodes the boundaries of the image object appearing in the binary image. In addition, the erosion operation 815 may remove any salt noise depicted in the binary image, specifically any sparsely occurring white pixels that are not a part of the image object.

The dilation operation 820 may access the binary image processed by the erosion operation 815. Similar to the erosion operation 815, the image-processing kernel is set on the first pixel of the binary image. As the image-processing kernel traverses through each pixel of the processed binary image, a pixel with a value of 0 (e.g., black) may be converted into 1 (e.g., white) if at least one neighboring pixel covered by the kernel has a value of 1. In effect, the dilation operation 820 may gradually enlarge the boundaries corresponding to the biological structures depicted in the processed binary image. In addition, similar to a hole filling operation, the dilation operation 820 may remove any pepper noise depicted in binary image, specifically any sparsely occurring black pixels that are within the image object.

Performing the erosion operation 815 followed by the dilation operation 820 can remove salt noise from each of the set of binary images 835. The sequence of such operations can be referred to as an opening operation. Conversely, performing the dilation operation 820 followed by the erosion operation can remove pepper noise from each of the set of binary images 835. The sequence of dilation followed by erosion can be referred to as closing operation. By performing the erosion operation 815 and/or the dilation operation 820 in different order, the binary converter subsystem 810 can remove any sharp and sudden disturbances in each of the set of binary images 835. The set of binary images can be provided to the image registration subsystem.

Figure 9A:
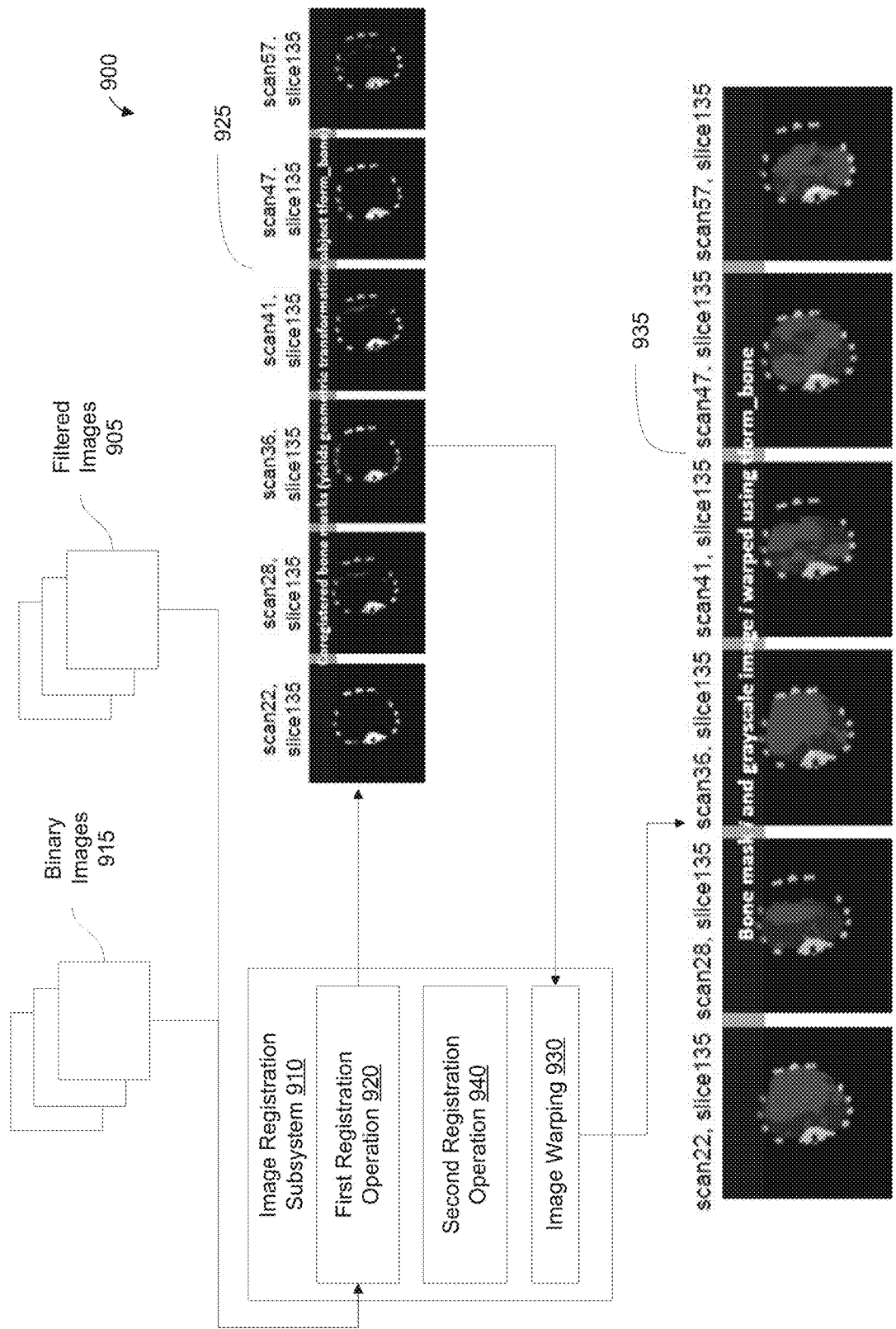
FIGS. 9A-B illustrate example schematic diagrams of image registration subsystem that registers binary images into a single spatial coordinate system according to some embodiments.
Figure 9B:
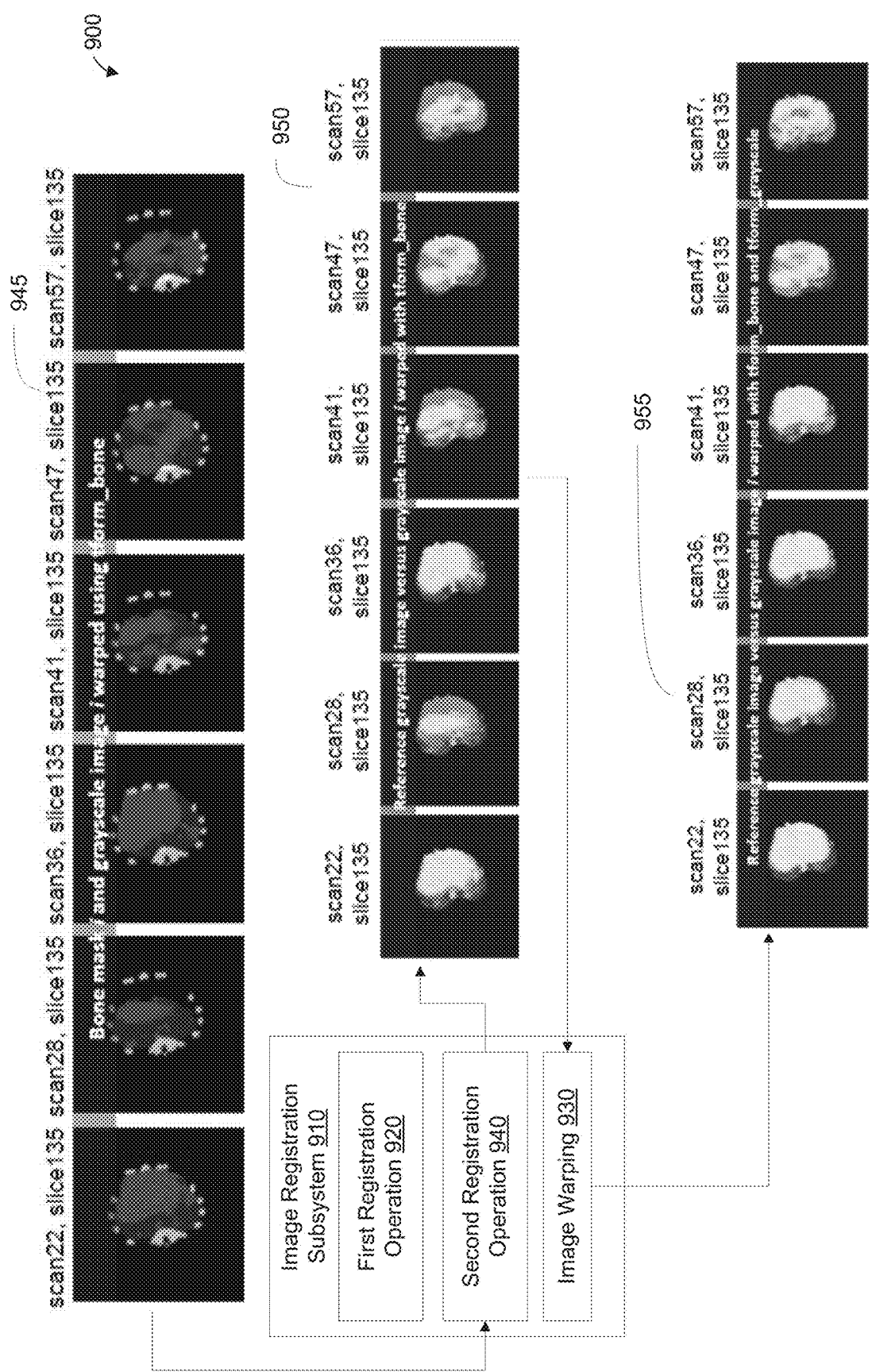

II.F. Example Schematic Diagram of an Image Registration Subsystem of an Image Processing System FIGS. 9A-B illustrate example schematic diagrams 900 of image registration subsystem that registers binary images into a single spatial coordinate system according to some embodiments. Specifically, the image registration subsystem 910 may process these sets of images using a series of image registration operations. An image registration operation can refer to an optimization process, where the "moving" image is warped such that pairwise distance between all voxels in the "moving" image relative to those in the "fixed" or reference image is minimized. The image registration operations can be performed such that the processed images are aligned on corresponding regions of the reference image (e.g., skeletal structures, lungs). Each image registration operation can result in a set of output images that are better scaled, aligned, and rotated to fit in a single coordinate system. Subsequent image registration operations may calibrate and consequently improve the alignment of the set of output images. By using the registered images for training machine-learning models, the image registration operations can improve accuracy and performance of the trained machine-learning models.

In FIG. 9A, an image registration subsystem 910 may access a set of filtered images 905 (e.g., the first and second sets of filtered images of FIG. 6) and a set of binary images 915 (e.g., the binary images 835 of FIG. 8). During a first registration operation 920, the image registration subsystem 910 may initially select a reference image from the set of filtered images 905. The reference image may refer to a filtered image that includes location parameters, such that the set of binary images 915 can be aligned based on the location parameters. From the reference image, a reference filter can be generated that corresponds to image regions of the reference image that depict skeletal structures (e.g., a reference bone mask). Filters of the set of filtered images 905 (e.g., bone mask filters) corresponding to the reference filter can be registered such that the filtered images of the first subset can be aligned, as shown in a first set of aligned images 925. By registering the filters, a first set of transformation parameters (e.g., tform) can be determined. The first set of transformation parameters can indicate an estimated set of numerical values corresponding to affine or linear transformation (e.g., rotation, scale, translation, shear) applied to each filtered image of the set of filtered images 905 to the reference image.

The image registration subsystem 910 may apply the first set of transformation parameters to each of the set of filtered images 905 and the set of binary images 915 using an image warping operation 930. For each of the set of binary images 915, the image warping operation 930 may warp the binary image using the first set of transformation parameters to adjust its position and orientation. Each filtered image of the set of filtered images 905 can also be warped using the first transformation parameters, such that the warped filtered images can be used to generate transformation parameters for subsequent registration operations. The image registration subsystem 910 may output the warped set of filtered images 905 and the set of binary images 915 as a set of warped images 935.

In FIG. 9B, the image registration subsystem 910 may access and perform a second registration operation 940 on each of the set of warped images 935. During the second registration operation 940, the image registration subsystem 910 may use the same reference image that was used by the first registration operation 920 of FIG. 9A. The reference image can include a reference filtered grayscale image. The reference image can be used to register each filtered image (e.g., a filtered grayscale image) of the set of filtered images 905, such that the filtered images of the set of filtered images 905 can be aligned towards the reference image, as shown in a second set of aligned images 950. By registering the filtered images of the set of filtered images 905, a second set of transformation parameters can be determined (e.g., tform_grayscale). The second set of transformation parameters can indicate an estimated set of numerical values corresponding to affine or linear transformation (e.g., rotation, scale, translation, shear) applied to each filtered image of the set of warped images 935 to the reference image.

The image registration subsystem 910 may apply the second set of transformation parameters to each of the set of warped images 935 using the image warping operation 930. For each of the set of warped images 935, the image warping operation 930 may warp the warped image again using the second set of transformation parameters to adjust its position and orientation. The image registration subsystem 910 may output the warped set of filtered images 905 and the set of binary images 915 as a set of registered images 955. In some instances, only the first registration operation 920 is performed to generate the set of registered images 955. For example, the set of warped images 935 are the set of registered images 955 that can be subsequently processed by the image segmentation subsystem 1005.

Figure 10:
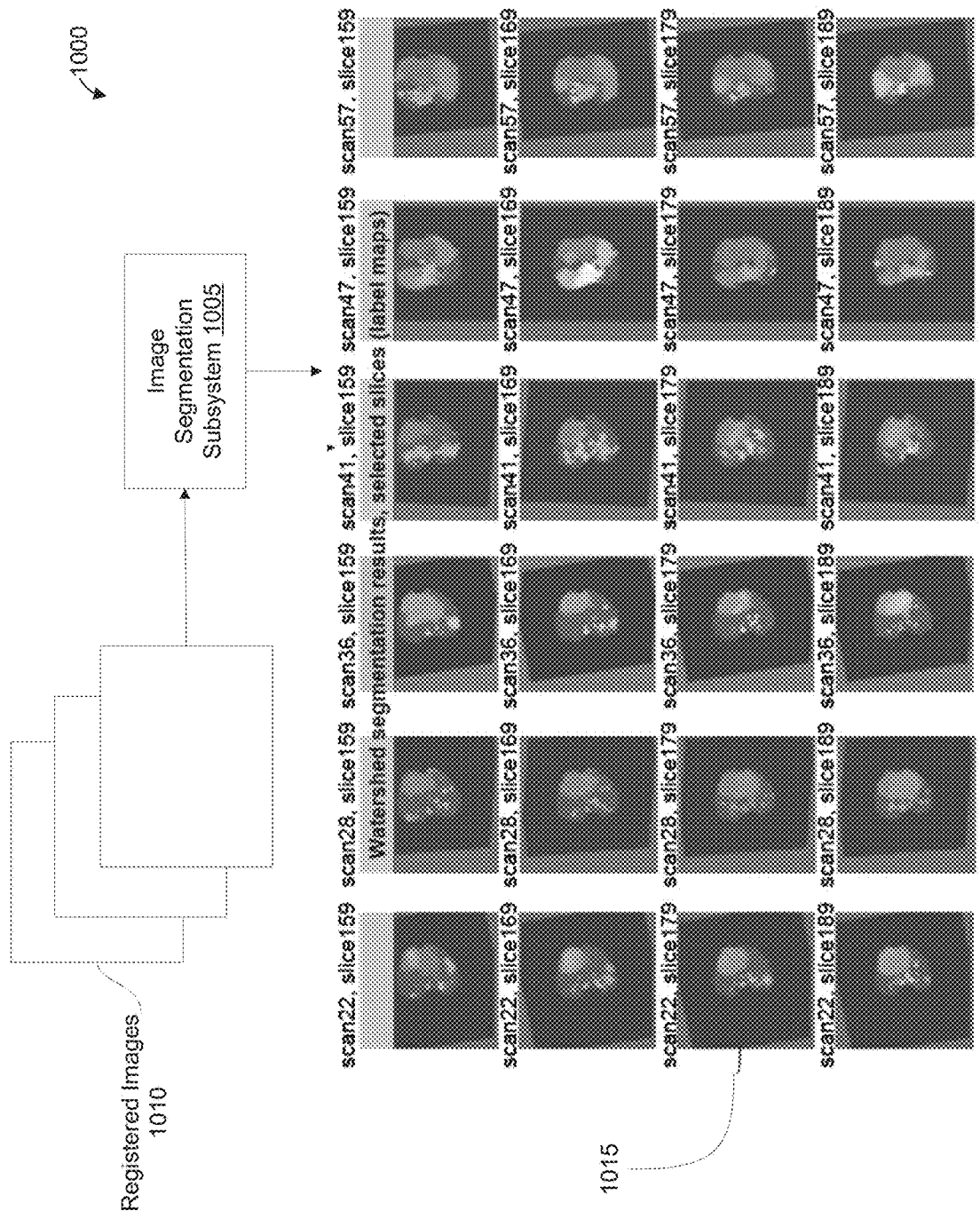
FIG. 10 illustrates an example schematic diagram of an image segmentation subsystem that extracts a set of image objects from a registered image according to some embodiments.

II.G. Example Schematic Diagram of an Image Segmentation Subsystem of an Image Processing System FIG. 10 illustrates an example schematic diagram 1000 of an image segmentation subsystem that extracts a set of image objects from a registered image according to some embodiments. An image segmentation subsystem 1005 may access a set of registered images 1010. The set of registered images 1010 may include one or more binary images (e.g., the set of binary images 835 of FIG. 8) applied with one or more registration operations (e.g., the first registration operation 920 of FIG. 9A, the second operation 940 of FIG. 9B) For each of the set of registered images 1010, the image segmentation subsystem 1005 may perform a watershed segmentation to extract a set of image objects. To perform the watershed segmentation, the image segmentation system 1005 may erode each registered image of the set of registered images 1010 and identify new image objects in the registered image as they become separated and vanish. The image segmentation system 1005 may then create seed points for each of the new image objects, at which each seed point of the seed points can be conditionally dilated (layers added) until the registered image is filled. These operations can be repeated, such that the set of image objects can be extracted from the registered image.

Additionally or alternatively, the image segmentation subsystem 1005 may reverse pixels of each registered image of the set of registered images 1010 to transform the registered image into its complement image. For example, black pixels corresponding to a part of the registered image can be converted into white pixels, and white pixels corresponding to another part of the registered image can be converted into black pixels. As the watershed segmentation continues, the image segmentation subsystem 1005 may process each complement image corresponding to the set of registered images 1010 by using a negative distance transform operation. For each pixel corresponding to each complement image, the negative distance transform operation may be performed to identify a distance value from the pixel to a nearest nonzero-valued pixel, compute a negative value of the identified distance value, and transform the pixel based on the computed negative value. As a result of transforming the pixels corresponding to the complement images, the image segmentation subsystem 1005 may generate a set of transformed images and process the set of transformed images through a segmentation algorithm (e.g., a watershed algorithm). The segmentation algorithm may generate a set of segmented images 1015, in which a set of lines can be depicted in each of the set of segmented images 1015. For each segmented image of the set of segmented images 1015, the image segmentation subsystem 1005 may extract a set of image objects by using the set of lines as boundaries corresponding to each image object represented in the segmented image.

Figure 11:
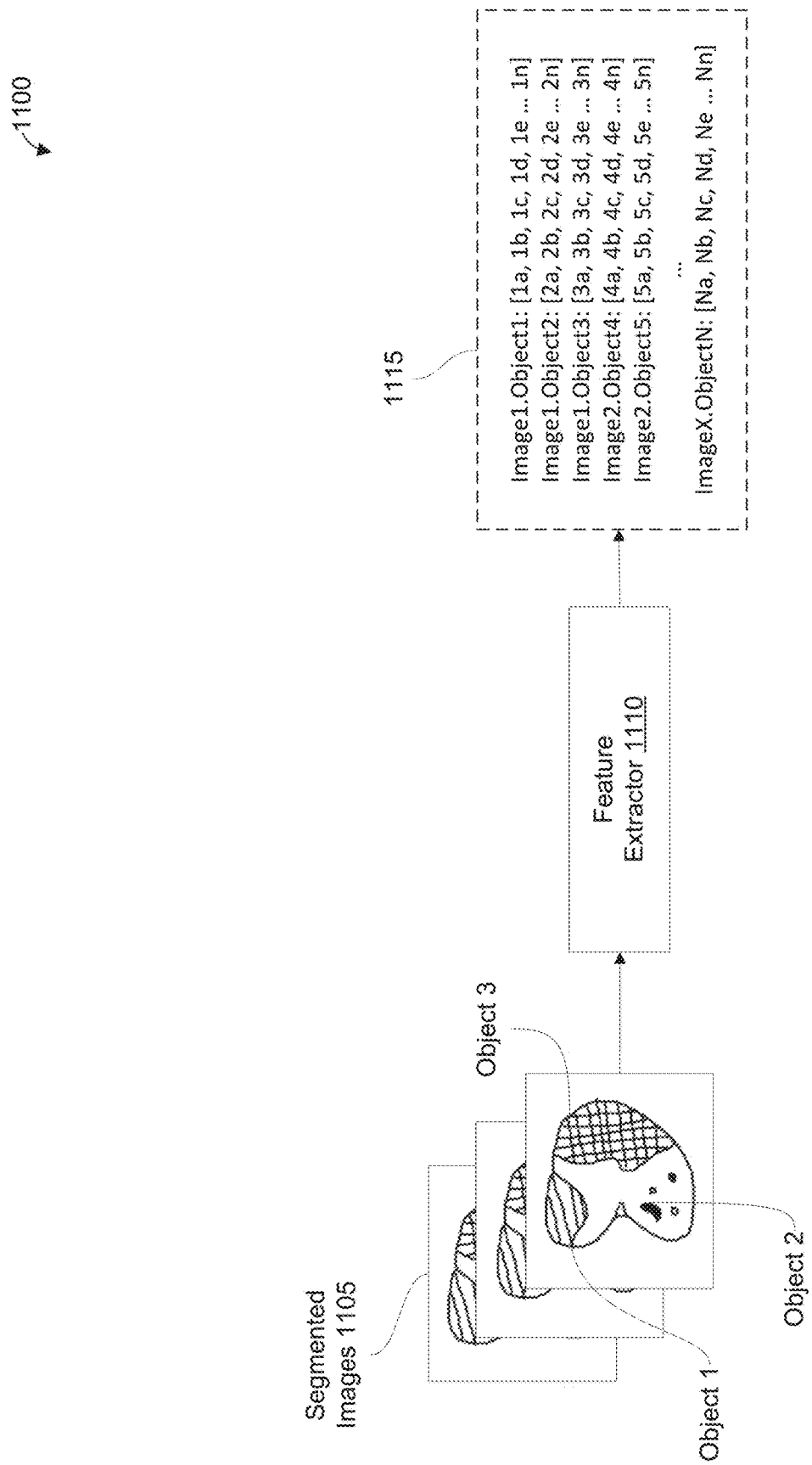
FIG. 11 illustrates an example schematic diagram of a feature extractor subsystem that identifies a set of structural characteristics associated with an image object according to some embodiments.

II.H. Example Schematic Diagram of a Feature Extractor Subsystem of an Image Processing System II.H.1 Identifying Structural Characteristics of Image Objects FIG. 11 illustrates an example schematic diagram 1100 of a feature extractor subsystem that identifies a set of structural characteristics associated with an image object according to some embodiments. A set of segmented images 1105 (e.g., the set of segmented images 1015) can be accessed. For each segmented image of the set of segmented images 1105, a set of image objects can be identified based on a set of lines depicted in the segmented image. A feature extractor 1110 may access the set of image objects and determine the set of structural characteristics corresponding to each image object of the set of image objects. Each structural characteristic of the set of structural characteristics includes a value that corresponds to a particular structural-characteristic category (e.g., diameter, surface area, a shape, centrally convex volume, voxel intensity). For each image object, the feature extractor 1110 may store the set of structural characteristics corresponding to the image object in a data structure 1115 (e.g., an array), in which an identifier may be assigned to identify the image object. The data structure 1115 storing the set of structural characteristics of the image object can be transmitted to a trained machine-learning model, which may estimate whether the image object corresponds to a tumor based on the determined structural characteristics.

Various types of the set of structural characteristics can be determined by the feature extractor 1110, which can be processed and considered by the trained machine-learning model. The trained machine-learning model can include various types of machine-learning models, such as a discriminant-analysis model, a kernel classification model, a k-nearest neighbor model, a linear classification model, a Naive Bayes classifier, a support vector machine, a gradient-boosted Ensemble classification algorithm, and/or one or more classification trees. For example, the set of structural characteristics may include, but are not limited to, structural characteristics corresponding to the following structural-characteristic categories:

"Boundingbox"—Smallest cuboid containing the region, returned as a 1-by-6 vector of the form [ulf_x ulf_y ulf_z width_z width_y width_z]. ulf_x, ulf_y, and ulf_z specify the upper-left front corner of the cuboid. width_z, width_y, and width_z specify the width of the cuboid along each dimension;

"Centroid"—Center of mass or the region, returned as a 1-by-3 vector of the form [centroid_x centroid_y and centroid_z]. The first element centroid_x is the horizontal coordinate (or x-coordinate) of the center of mass. The second element, centroid_y is the vertical coordinate (or y-coordinate). The third element, centroid_z, is the planar coordinate (or z-coordinate);

"ConvexHull"—Smallest convex polygon that can contain the region, returned as a p-by-3 matrix. Each row of the matrix contains the x-, y-, and z-coordinates of one vertex of the polygon;

"ConvexImage"—Image of the convex hull, returned as a volumetric binary image (logical) with all voxels within the hull filled in (set to 'on'). The image is the size of the bounding box of the region;

"ConvexVolume"—Number of voxels in "ConvexImage", returned as a scalar;

"EigenValues"—Eigenvalues of the voxels representing a region, returned as a 3-by-1 vector. For example, regionprops3 operation may use the eigenvalues to calculate the principal axes lengths;

"EigenVectors"—Eigenvectors or the voxels representing a region, returned as a 3-by-3 vector. For example, regionprops3 operation may use the eigenvectors to calculate the orientation of the ellipsoid that has the same normalized second central moments as the region;

"EquivDiameter"—Diameter of a sphere with the same volume as the region, returned as a scalar. Computed as (6*Volume/pi)^(⅓);

"Extent"—Ratio of voxels in the regions to voxels in the total bounding box, returned as a scalar. Computed as the value of Volume divided by the volume of the bounding box. [Volume/(bounding box width*bounding box height*bounding box depth)];

"Image"—Bounding box of the region, returned as a volumetric binary image (logical) that is the same size as the bounding box of the region. The 'on' voxels correspond to the region, and all other voxels are 'off';

"Orientation" (x, y, and z values)—Euler angles, returned as a 1-by-3 vector. The angles are based on the right-hand rule. For example, regionprops3 operation may interpret the angles by looking at the origin along the x-, y-, and z-axis representing roll, pitch, and yaw, respectively. A positive angle represents a rotation in the counterclockwise direction. Rotation operations are not commutative so they can be applied in the correct order to have the intended effect;

"PrincipalAxisLength" (x, y, and z values)—Length (in voxels) of the major axes of the ellipsoid that have the same normalized second central moments as the region, returned as 1-by-3 vector. For example, regionprops3 operation may sort the values from highest to lowest;

"Solidity"—Proportion of the voxels 1n the convex hull that are also in the region, returned as a scalar. Computed as Volume/ConvexVolume;

"SubarrayIdx"—Indices used to extract elements inside the object bounding box, returned as a cell array such that L(idx{:}) extracts the elements of L inside the object bounding box;

"SurfaceArea"—Distance around the boundary of the region, returned as a scalar;

"Volume"—Count of the actual number of 'on' voxels in the region, returned as a scalar. Volume represents the metric or measure of the number of voxels in the regions within the volumetric binary image, BW;

"VoxelIdxList"—Linear Indices of the voxels in the region, returned as a p-element vector; and "VoxelList"—Locations of voxels in the region, returned as a p-by-3 matrix. Each row of the matrix has the form [x y z] and specifies the coordinates of one voxel in the region.

II.H.2 Example Structural Characteristics of Image Objects

FIGS. 12 to 17 show example sets of box plots that identify structural characteristics of image objects detected by an image segmentation subsystem. The box plots of FIGS. 12 to 17 show a data corresponding to feature arrays (e.g., a feature array generated by the feature extractor 1110 of FIG. 11). The feature arrays represented the training images used to train the machine-learning models for automatically detecting at least part of a tumor from images. For example, the plots show object features for objects of the training images that were manually labeled using a labeling application (e.g., FIGS. 20A-C). As the difference between the Tumor and Non-tumor box plots increases across FIGS. 12-17, the machine-learning model (e.g., an SVM) will be increasingly likely to be able to distinguish between tumor and non-tumor objects, after being trained. For each of the box plots in FIGS. 12 to 17, horizontal line represents a median value (e.g., object volume) representing each class (e.g., tumor, non-tumor), and edges of the "box" represent values that belong within the 25% and 75% quantiles. The vertical, dashed lines (whiskers) indicate the total range of the values corresponding to each class.

Figure 12:
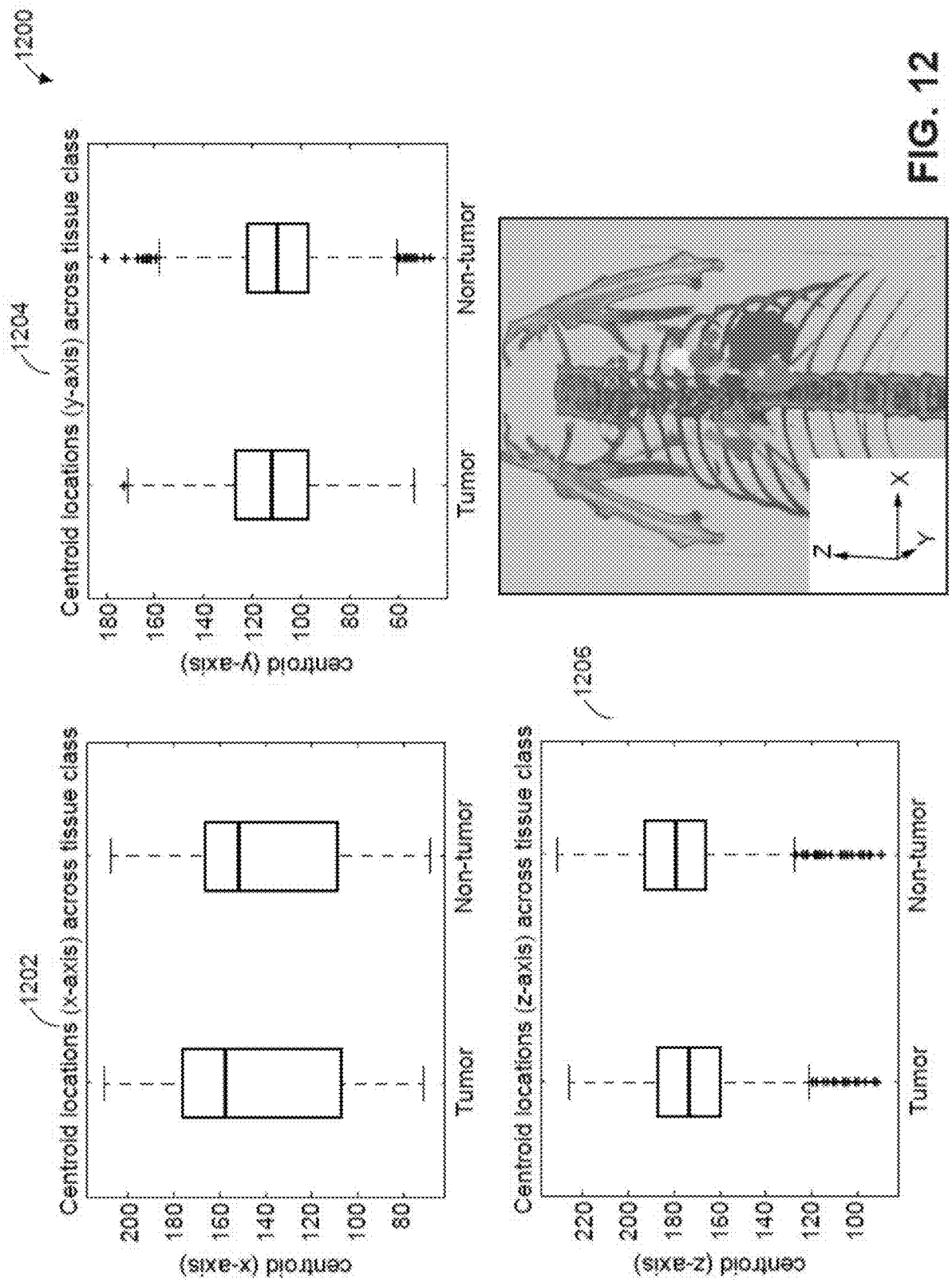
FIG. 12 shows example sets of box plots corresponding to distributions of centroid locations of image objects detected by an image segmentation subsystem.

FIG. 12 shows example sets of box plots 1200 corresponding to distributions of centroid locations of image objects detected by an image segmentation subsystem. Each of box plots 1202, 1204, and 1206 shows a first distribution of centroid locations for a first set of image objects classified as tumor regions and a second distribution of centroid locations for a second set of image objects classified as non-tumor regions. In addition, the box plots 1202 show distributions of centroid locations of the image objects along the x-axis, the box plots 1204 show distributions of centroid locations of the image objects along the y-axis, and the box plots 1206 show distributions of centroid locations of the image objects along the z-axis. As shown in the box plots 1202, 1204, and 1206, there are similar distributions of centroid locations between the image objects classified as tumor regions and the image objects classified as non-tumor regions, which may indicate that centroid location features are less likely to be predictive for detecting tumor regions from images, relative to other features.

Figure 13:
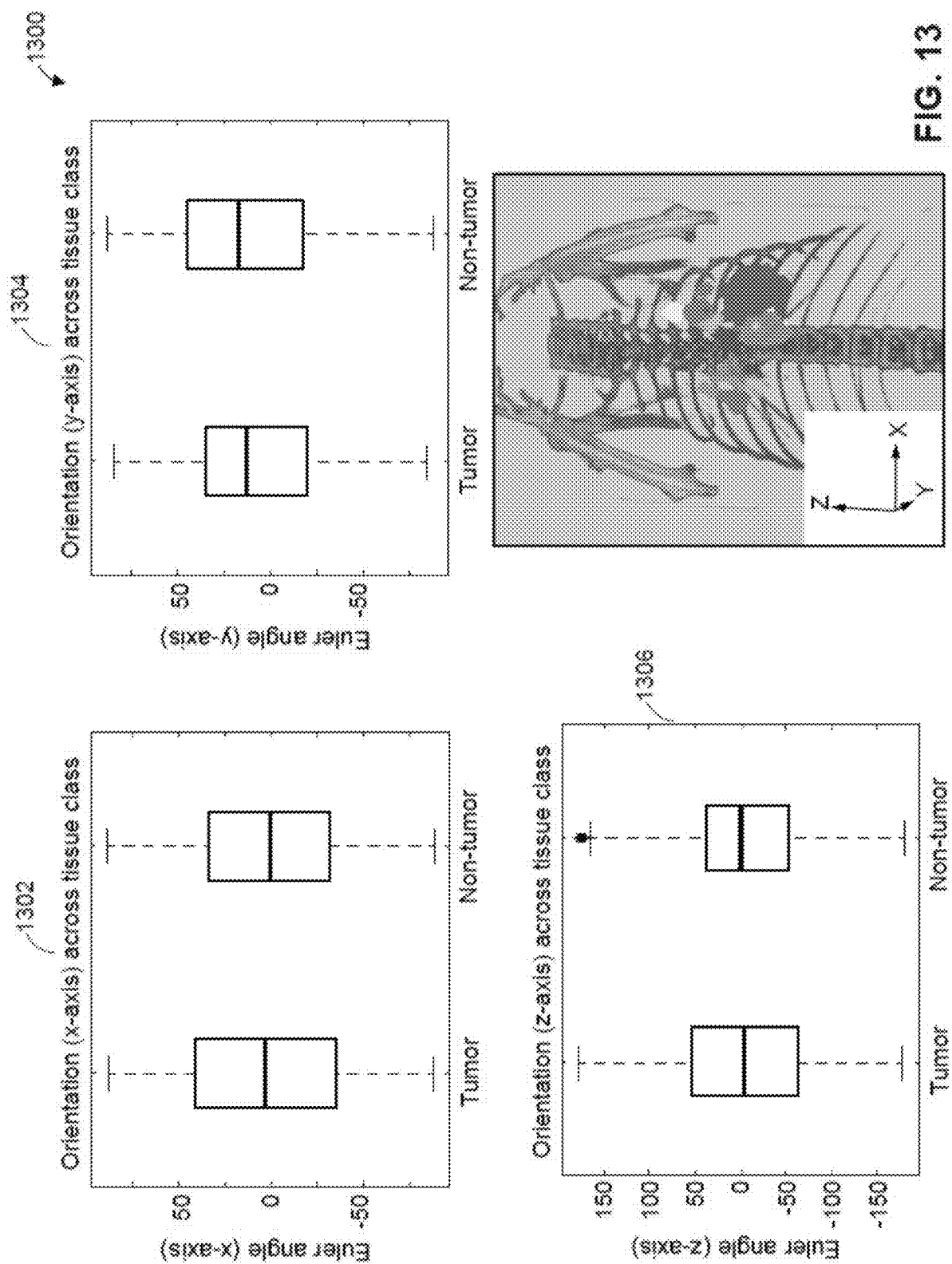
FIG. 13 shows example sets of box plots corresponding to distributions of orientations of image objects detected by an image segmentation subsystem.

FIG. 13 shows example sets of box plots 1300 corresponding to distributions of orientations of image objects detected by an image segmentation subsystem. Each of box plots 1302, 1304, and 1306 shows a first distribution of orientations for a first set of image objects classified as tumor regions and a second distribution of orientations for a second set of image objects classified as non-tumor regions. A magnitude of orientation is expressed in Euler angle units. In addition, the box plots 1302 show distributions of orientations of the image objects along the x-axis, the box plots 1304 show distributions of orientations of the image objects along the y-axis, and the box plots 1306 show distributions of orientations of the image objects along the z-axis. As shown in the box plots 1302, 1304, and 1306, there are similar distributions of orientations between the image objects classified as tumor regions and the image objects classified as non-tumor regions, which may indicate that object orientation features are less likely to be predictive for detecting tumor regions from images, relative to other features. For example, the box plot 1302 showed that orientation of objects along the x-axis (plot 1302 in FIG. 13) appear similar for Tumor and Non-tumor classes. The box plot 1032 thus indicates that object orientation is likely not as predictive of tissue class (although it still may be informative), relative to other features (e.g., object volume).

Figure 14:
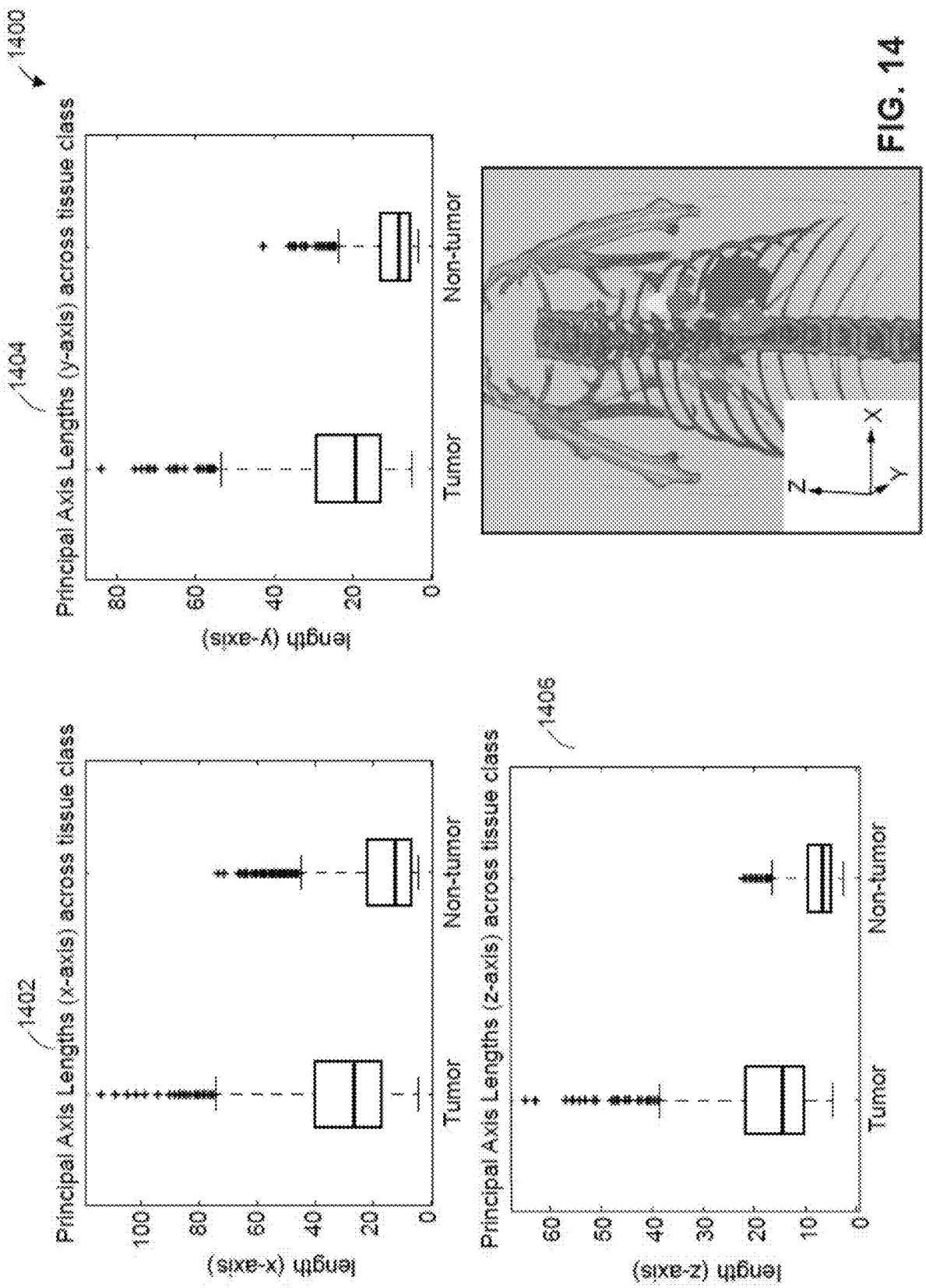
FIG. 14 shows example sets of box plots corresponding to distributions of principal axis lengths of image objects detected by an image segmentation subsystem.

FIG. 14 shows example sets of box plots 1400 corresponding to distributions of principal axis lengths of image objects detected by an image segmentation subsystem. Each of box plots 1402, 1404, and 1406 shows a first distribution of principal axis lengths for a first set of image objects classified as tumor regions and a second distribution of principal axis lengths for a second set of image objects classified as non-tumor regions. In addition, the box plots 1402 show distributions of principal axis lengths of the image objects along the x-axis, the box plots 1404 show distributions of principal axis lengths of the image objects along the y-axis, and the box plots 1406 show distributions of principal axis lengths of the image objects along the z-axis. As shown in the box plots 1402, 1404, and 1406, the principal axis lengths corresponding to the image objects classified as tumor regions are, on average, greater than the principal axis lengths corresponding to image objects classified as non-tumor regions. Such observation may indicate that principal axis lengths are more likely to be predictive for detecting tumor regions from images, relative to other features (e.g., centroid locations shown in FIG. 12).

Figure 15:
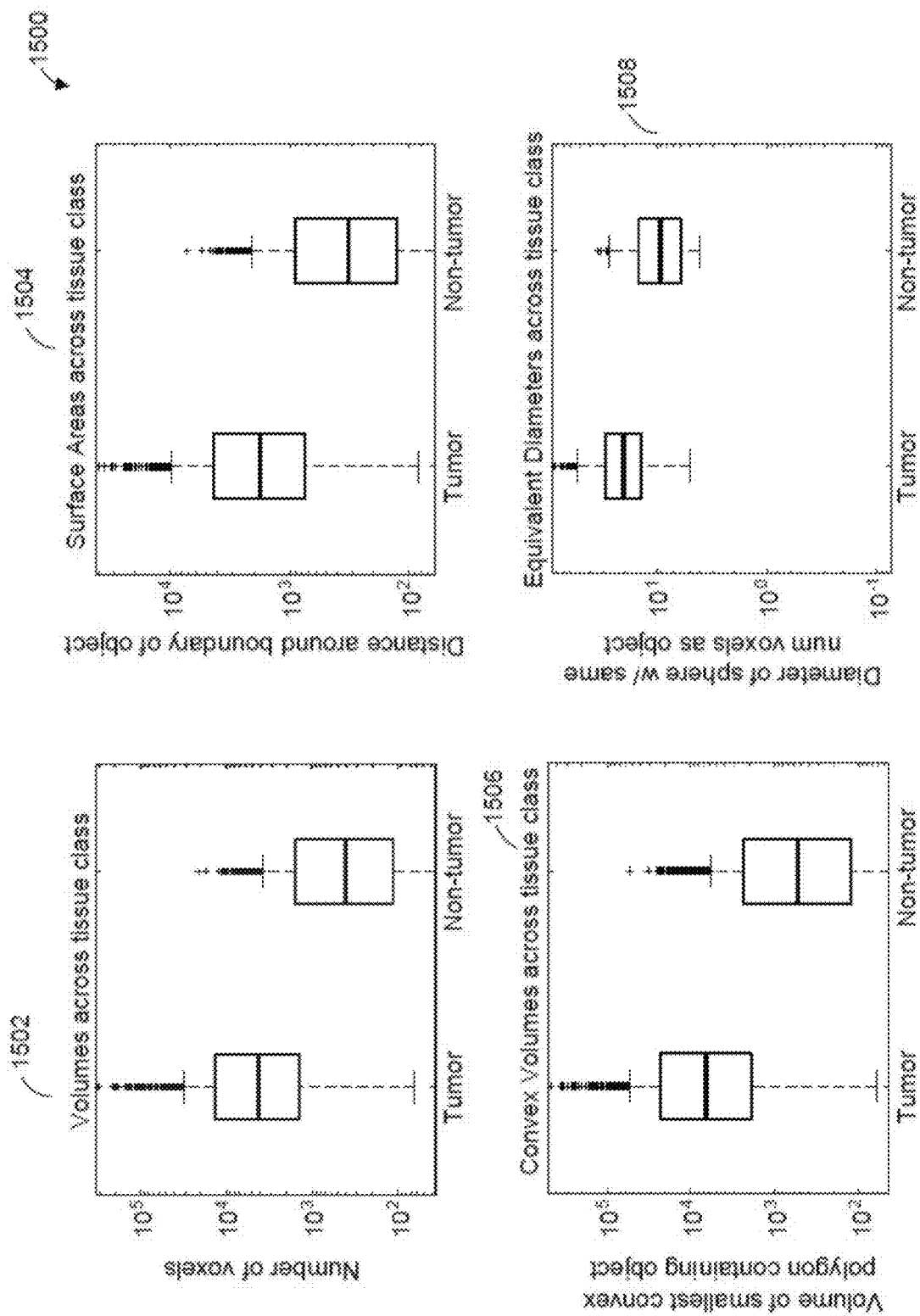
FIG. 15 shows example sets of box plots corresponding to distributions of sizes of image objects detected by an image segmentation subsystem.

FIG. 15 shows example sets of box plots 1500 corresponding to distributions of sizes of image objects detected by an image segmentation subsystem. Each of box plots 1502, 1504, 1506, and 1508 shows a first distribution of sizes for a first set of image objects classified as tumor regions and a second distribution of sizes for a second set of image objects classified as non-tumor regions. In addition, the box plots 1502 show distributions of tissue volumes of the image objects expressed in voxel units, the box plots 1504 show distributions of surface areas of the image objects expressed in distance around boundary of a corresponding image object, the box plots 1506 show distributions of convex volume of the image objects expressed in volume of smallest convex polygon containing a corresponding image object, and the box plots 1508 show distributions of equivalent diameters of the image objects expressed in diameter of sphere with same number of voxels measured for a corresponding image object. As shown in the box plots 1502, 1504, 1506, and 1508, the size characteristics (e.g., volume, surface area, equivalent diameter) corresponding to the image objects classified as tumor regions are, on average, greater than the size characteristics corresponding to image objects classified as non-tumor regions. Such observation may indicate that size characteristic features are more likely to be predictive for detecting tumor regions from images, relative to other features. For example, the box plot 1502 in FIG. 15 showed that objects labeled "Tumor" have an average volume approximately 10 times higher than the non-tumor objects. The box plot 1502 thus indicates that an object volume is likely to be a meaningful feature and highly predictive to which class the object belongs, respect to using the trained machine-learning model to predict object classes for a new image that is not part of the training set.

Figure 16:
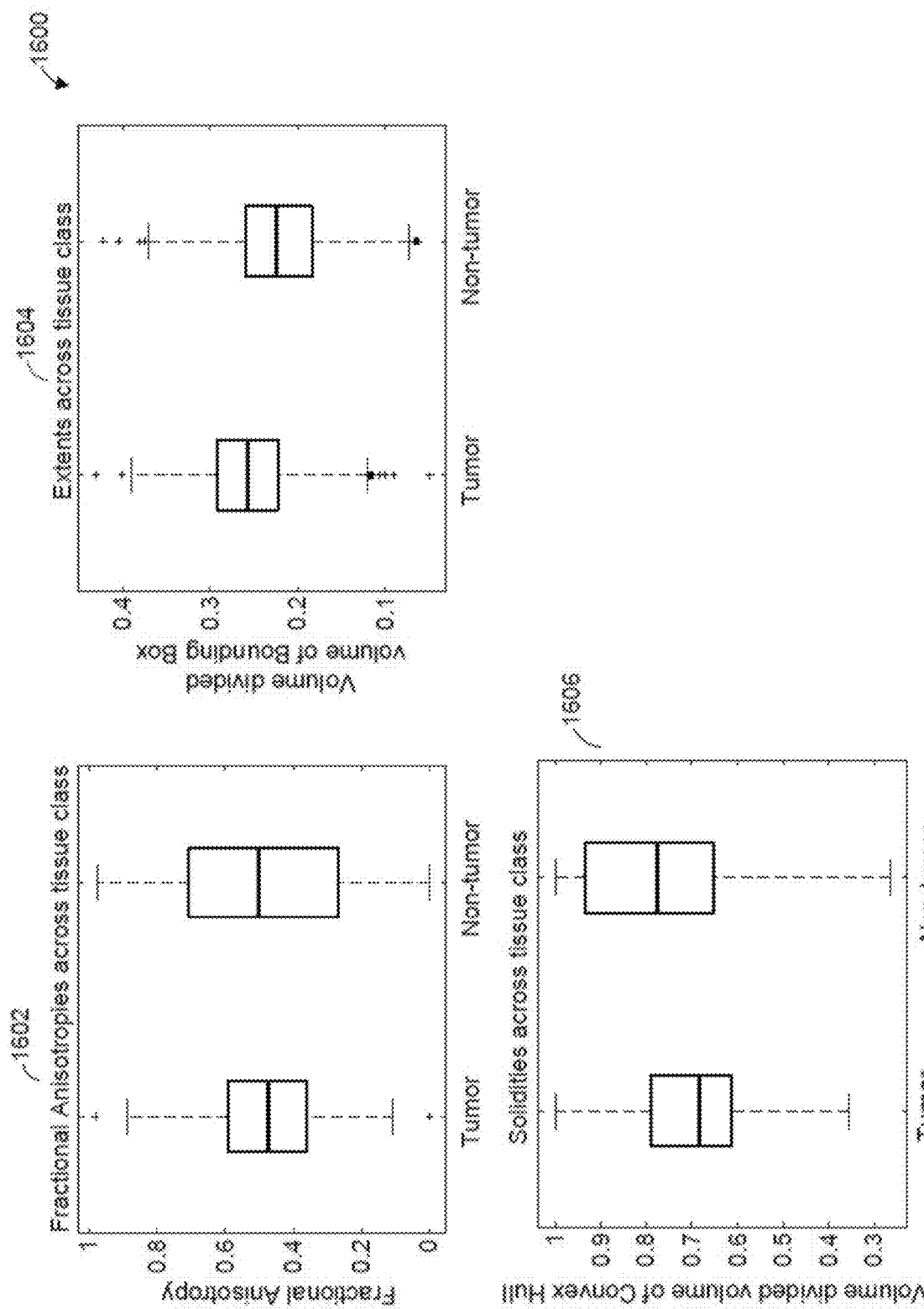
FIG. 16 shows example sets of box plots corresponding to distributions of shapes of image objects detected by an image segmentation subsystem.

FIG. 16 shows example sets of box plots 1600 corresponding to distributions of shapes of image objects detected by an image segmentation subsystem. Each of box plots 1602, 1604, and 1606 shows a first distribution of shapes for a first set of image objects classified as tumor regions and a second distribution of shapes for a second set of image objects classified as non-tumor regions. In addition, the box plots 1602 show distributions of fractional anisotropies of the image objects. While the median values corresponding to fractional anisotropies were similar for image objects in both tumor and non-tumor regions, the interquartile range of the distribution was greater in images objects classified as non-tumor regions. The box plots 1604 show distributions of extents of the image objects expressed in tissue volume divided by volume of bounding box. The extents across tissue class were greater in image objects classified as tumor regions. The box plots 1606 show distributions of solidities of the image objects expressed in tissue volume divided by volume of Convex Hull. The distributions of solidities were greater in image objects classified as non-tumor regions. As shown in the box plots 1602, 1604, and 1606, there are pronounced differences between shapes (e.g., extents, solidities) of the image objects classified as tumor regions and shapes of the image objects classified as non-tumor regions. Such observation may indicate that object shape features are more likely to be predictive for detecting tumor regions from images, relative to other features.

Figure 17:
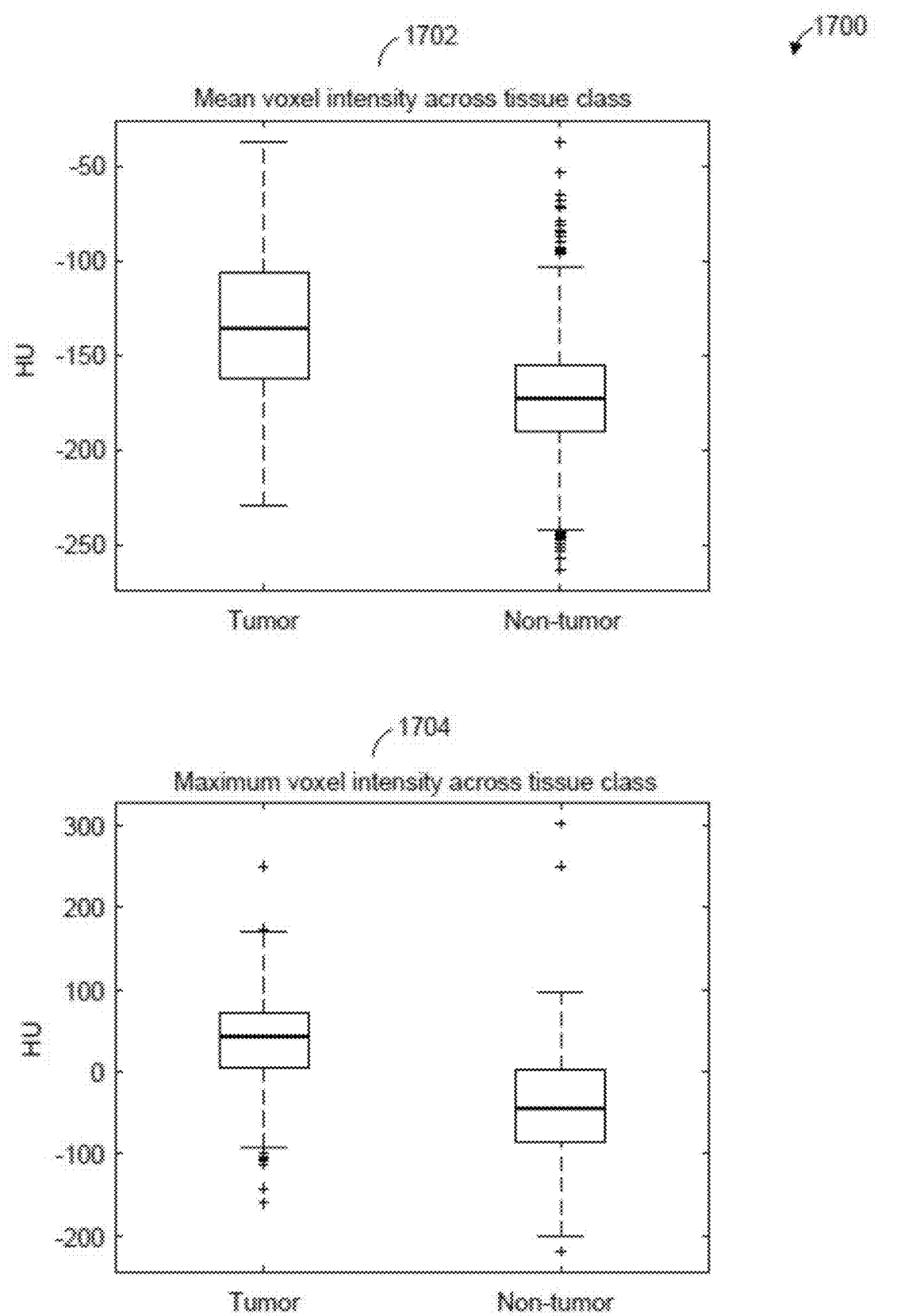
FIG. 17 shows example sets of box plots corresponding to distributions of voxel intensities of image objects detected by an image segmentation subsystem.

FIG. 17 shows example sets of box plots 1700 corresponding to distributions of voxel intensities of image objects detected by an image segmentation subsystem. Each of box plots 1702 and 1704 shows a first distribution of voxel intensities for a first set of image objects classified as tumor regions and a second distribution of voxel intensities for a second set of image objects classified as non-tumor regions. In addition, the box plots 1702 show distributions of mean voxel intensities of the image objects expressed in Hounsfield units, and the box plots 1704 show distributions of maximum voxel intensities of the image objects in Hounsfield units. As shown in the box plots 1702 and 1704, the voxel intensities corresponding to the image objects classified as tumor regions are greater than the voxel intensities corresponding to image objects classified as non-tumor regions, which may indicate that voxel intensity features are more likely to be predictive for detecting tumor regions from images, relative to other features (e.g., centroid locations shown in FIG. 12).

Figure 18:
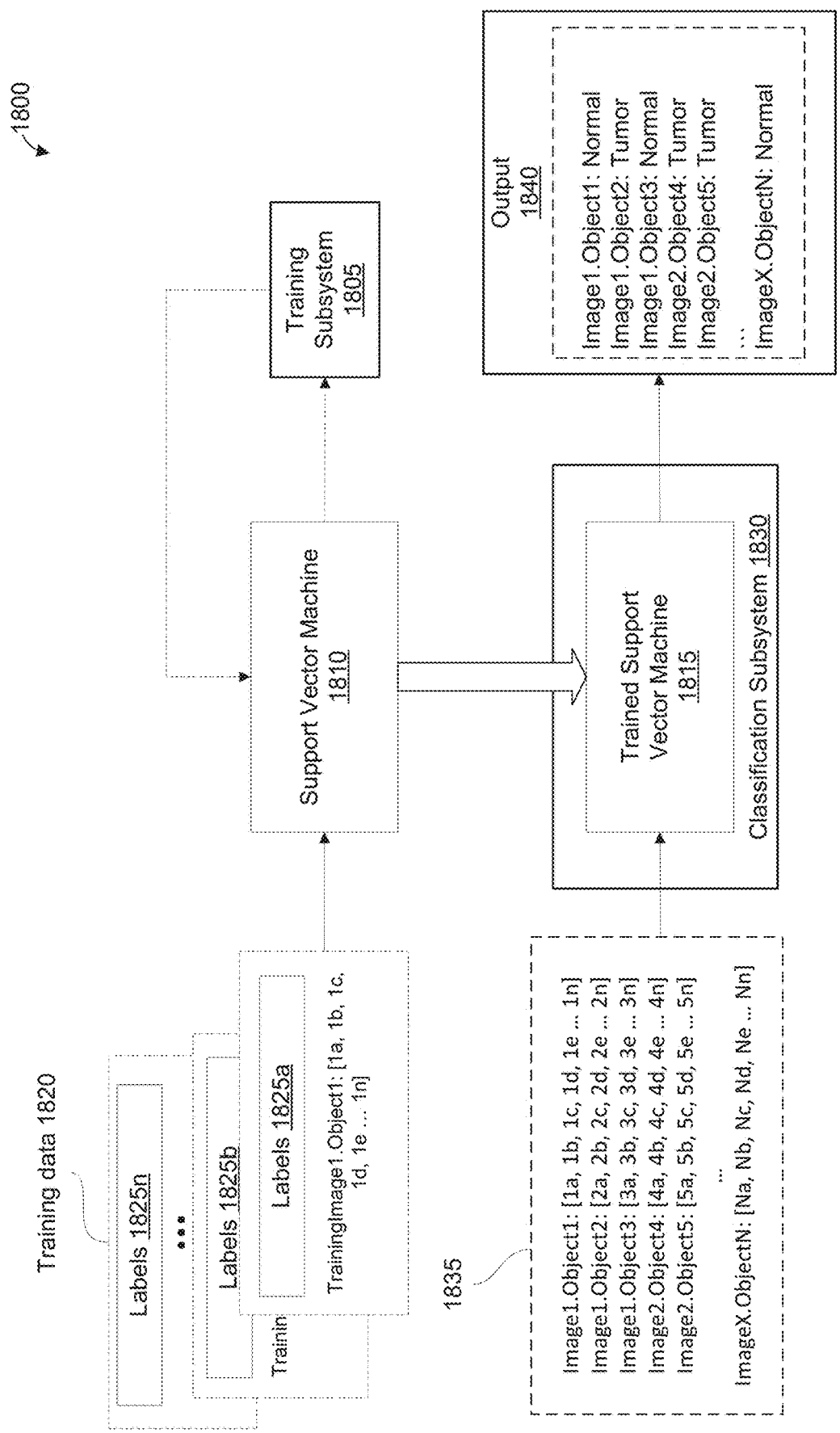
FIG. 18 illustrates an exemplary schematic diagram of a support vector machine for estimating whether an image object corresponds to a tumor according to some embodiments.

II.I. Example Schematic Diagram of a Classification Subsystem with a Trained Support Vector Machine FIG. 18 illustrates an exemplary schematic diagram 1800 of a support vector machine for estimating whether an image object corresponds to a tumor according to some embodiments. A training subsystem 1805 can train a support vector machine 1810 into a trained support vector machine 1815. To train the support vector machine 1810, the training subsystem 1805 may use training data 1820, which may include sets of structural characteristics that correspond to each training image object. Each set of structural characteristics can be respectively assigned with a corresponding label of a set of labels 1825a-n. For example, a first set of structural characteristics corresponding to a first training image object of the training data 1820 may correspond to a label 1825a, and a second set of structural characteristics corresponding to a second training image object of the training data 1820 may correspond to a label 1825b. Each label of the set of labels 1825a-n may indicate whether its corresponding set of structural characteristics indicates a tumor. The sets of structural characteristics can thus be used to characterize the training image in tumor-by-tumor basis in the training image. In effect, the trained machine-learning model can be used to detect individual tumor regions based on their respective structural characteristics (e.g., tissue volume). In some instances, these individual tumor regions are aggregated to identify a measured value for the entire training image, such as level of tumor burden.

II.I.1 Example Training Data for Training the Support Vector Machine

As described herein, the training data 1820 can correspond to structural characteristics that correspond to each training image object of the training images. The training data 1820 can represent a plurality of training images that correspond to scanned images of subjects. Each of the training images can be labeled as having no tumor, low tumor burden, medium tumor burden, or high tumor burden. For example, the training data 1820 included 71 scanned images, which were comprised of 21 images that indicate no tumor, 20 images that indicate low tumor burden, 15 images that indicate medium tumor burden, and 15 images that indicate high tumor burden. In this example, a level of tumor burden can be labeled for each training image based on the following criteria:

TABLE 1

Example criteria for tumor burden labeling

| Labels | Tumor level | Blood vessel volume | Tumor volume |
|---|---|---|---|
| No tumor | 0% | Mean (±SD) blood vessel volume (mL) = 0.023 ± 0.0056 Mean (±SD) blood vessel vol (% total lung vol) = 10 ± 2.2 | N/A |
| Low tumor burden | <20% of total lung volume | Mean (±SD) blood vessel volume (mL) = 0.028 ± 0.0061 Mean (±SD) blood vessel vol (% total lung vol) = 11 ± 2.4 | Mean (±SD) tumor volume (mL) = 0.018 ± 0.014 Mean (±SD) tumor vol (% total lung vol) = 6.9 ± 5.4 |
| Medium tumor burden | 20-40% of total lung volume | Mean (±SD) blood vessel volume (mL) = 0.029 ± 0.012 Mean (±SD) blood vessel vol (% total lung vol) = 8.4 ± 3.5 | Mean (±SD) tumor volume (mL) = 0.1 ± 0.032 Mean (±SD) tumor vol (% total lung vol) = 30 ± 5.2 |
| High tumor burden | 40-70% of total lung volume | Mean (±SD) blood vessel volume (mL) = 0.010 ± 0.008 Mean (±SD) blood vessel vol (% total lung vol) = 2.1 ± 1.8 | Mean (±SD) tumor volume (mL) = 0.29 ± 0.05 Mean (±SD) tumor vol (% total lung vol) = 56 ± 10 |

From the 71 scanned images, 12 images were identified as hold-out set for testing. In addition, the training data 1820 can include 1941 training image objects, of which 364 training image objects were identified as the hold-out set for testing.

II.I.2 Feature Selection

The support vector machine 1810 (or other machine-learning models such as a gradient-boosted algorithms) can be trained using a subset of the set of structural characteristics associated with each training image object. Such feature selection technique reduces the number of input variable for training the machine-learning model to enable efficient use of computing resources and potentially improve performance of the trained machine-learning model by reducing noise.

For example, the subset of structural characteristics can be selected by processing the sets of structural characteristics of the training data 1820 and generating, for a structural-characteristic category (e.g., orientation, centroid location), a first distribution of structural-characteristic values corresponding a tumor region and a second distribution of structural-characteristic values corresponding to a non-tumor region. A statistical difference between the two distributions can be identified. For instance, the statistical difference corresponds to a difference of median or mean values between the first and second distributions. The statistical difference of two distributions can be analyzed to determine whether the structural-characteristic value of the corresponding category can be added as an element of the subset of structural characteristics. If so, the structural characteristic of the image object that is associated with the corresponding category can be added as an element of the subset of structural characteristics for the image object. In some instances, the subset of structural characteristics includes values corresponding to structural-characteristic categories such as volume, surface area, equivalent diameter, and voxel intensity of the image object.

Additionally or alternatively, the subset of structural characteristics can be selected by processing the sets of structural characteristics of the training data 1820 to generate, for each structural-characteristic category, a correlation metric (e.g., Pearson correlation coefficient). The correlation metric can be compared to a predefined threshold (e.g., 0.7). In response to determining that the correlation metric exceeds the predefined threshold, the structural characteristic value of the image object that is associated with the corresponding structural-characteristic category can be added as an element of the subset. In some instances, the subset of structural characteristics can be selected by generating a SHapley Additive exPlanations plot that identifies contribution of each structural characteristic category for reaching the tumor classification.

II.I.3 Support Vector Machine

For each set of structural characteristics of the training data 1820, the training subsystem 1805 may use values from the set of structural characteristics (e.g., shape, volume) to plot the set on a multi-dimensional graph that represents the support vector machine 1810. As a result, the training image objects (with the associated labels) corresponding to the sets of structural characteristics can be identified in the multi-dimensional graph corresponding to the support vector machine 1810. The training subsystem 1805 may then train the support vector machine 1810 by generating an optimal hyperplane that separates sets of structural characteristics assigned with tumor labels and sets of structural characteristics assigned with non-tumor labels. In some instances, a K-fold cross validation technique is used when optimizing one or more hyperparameters of the support vector machine. For example, a Bayesian hyperparameter optimization technique can be used when optimizing the one or more hyperparameters. Examples of hyperparameters can include the following:

TABLE 2

Examples of Hyperparameters

| Hyperparameter | Optimal Value | Description |
|---|---|---|
| PCA (%) | 98 | Reduces dimensionality of feature array from 16 to 12 (prevents overfitting) |
| Kernel Function | gaussian | Specifies type of hyperplane that forms decision boundaries |
| Polynomial Order | n/a | Higher order polynomial leads to overfitting |
| Kernel Scale | 15 | |
| Box Constraint | 500 | Regularization parameter (loss function penalty term; prevents overfitting) |
| Standardize Data | 1 | Data normalization; improves optimization efficiency |
| Multiclass Method | onevsall | Primarily impacts computation time |

The trained support vector machine with the optimal hyperplane can then be tested using the hold-out data set (e.g., 21 images from the 71 total scanned images). As a result of generating the optimal hyperplane, the training subsystem 1805 may determine that the support vector machine 1810 has been adequately trained for classification. The trained support vector machine 1815 with the optimal hyperplane can then be used by the classification subsystem 1830.

The classification subsystem 1830 may process information stored in a data structure 1835 by using the trained support vector machine 1815 and estimate whether an image object indicated in the data structure 1835 corresponds to a tumor. For the data structure 1835, the classification subsystem 1830 may access a set of structural characteristics corresponding to the image object and plot the values corresponding to the structural characteristics in the multi-dimensional graph having the optimal hyperplane for the trained support vector machine 1815. In some instances, a feature vector is generated to plot the corresponding set of structural characteristics in the multi-dimensional graph. Once the set of structural characteristics is plotted, the trained support vector machine 1815 may generate an estimation data indicating whether the image corresponds to a tumor based on a graph position of the data structure 1835 in relation to the optimal hyperplane of the trained support vector machine 1815. The classification subsystem 1830 may collect the estimation data corresponding to the image objects indicated in the data structure 1835 and generate an output 1840 that includes information indicating whether each of the image objects corresponds to a tumor, a lesion, or normal tissue. In some instances, the output 1840 identifies the image object as either a tumor or a non-tumor region. Additionally or alternatively, the output 1840 can identify the image object as a tumor, a vessel, or another object type.

The classification system 1830 can generate another output (not shown) that identifies a level of tumor burden corresponding to the biological structure depicted in the input image. The level of tumor burden can be determined by aggregating the image objects classified as having a tumor and generating a structural-characteristic value that represents the aggregated image objects (e.g., tumor volume). The generated structural-characteristic value can then be compared to a reference structural-characteristic value that represents all image objects segmented and identified from the image (e.g., lung volume). Such comparison can identify a proportion and/or ratio of the aggregated image objects relative to all image objects of the image. In some instances, the level of tumor burden identifies a low tumor burden (e.g., <20% of total lung volume), a medium tumor burden (e.g., 20-40% of total lung volume), or a high tumor burden (e.g., >40% of total lung volume). Additionally or alternatively, the classification system 1830 can identify a numerical value that represents the level of tumor burden of the image, such as a percentage of lung volume. The other output can be used to diagnose of level of cancer of the patient, identify a type of treatment for the subject corresponding to the image, and/or determine diagnostic or prognostic factors for the subject.

II.I.4 Example Results

Figure 19:
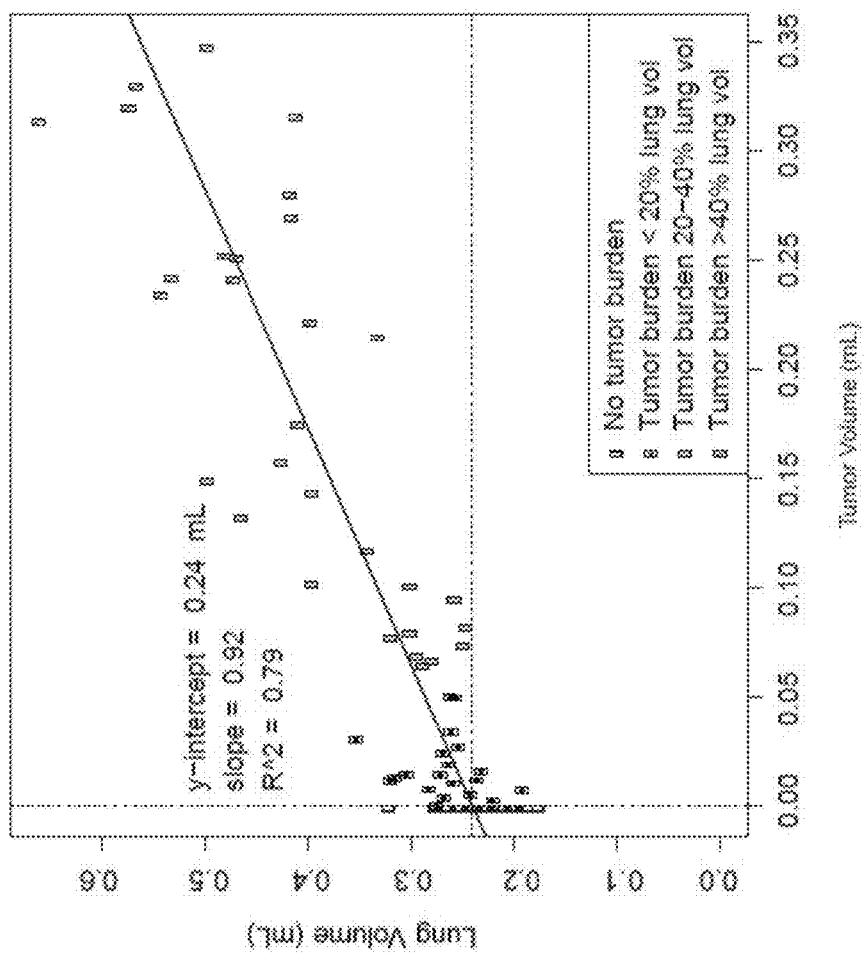
FIG. 19 shows an example of a graph that identifies a relationship between detected lung volumes from images and total tumor volumes.

FIG. 19 shows an example of a graph 1900 that identifies a relationship between detected lung volumes from images and total tumor volumes. As shown in the graph 1900, each plot point represents, for a corresponding image, a measured amount of tumor volume (x-axis) and an amount of lung volume detected by the trained 3D U-Net (y-axis). The y-intercept is shown as 0.24 mL, the slope is 0.92, and the $R^2$ is 0.79. Each image is classified as having no tumor burden, low tumor burden (<20% of lung volume), medium tumor burden (20-40% of lung volume), or high tumor burden (>40% of lung volume). The graph 1900 shows that the amount of lung volume detected by the trained 3D U-Net increases approximately proportionally to the increase of tumor burden. Such increase can indicate that lungs significantly expand in volume to accommodate tumor growth. The graph 1900 also demonstrates that the trained machine-learning model can be used to consistently capture changes in total lung volume under different physiological/disease conditions. The consistent and accurate performance of the machine-learning model can thus be reliably used for tracking cancer and other non-oncology disease progression (for example).

II.J. Example Schematic Diagram of a User Interface for Labeling Training Data

Figure 20A:
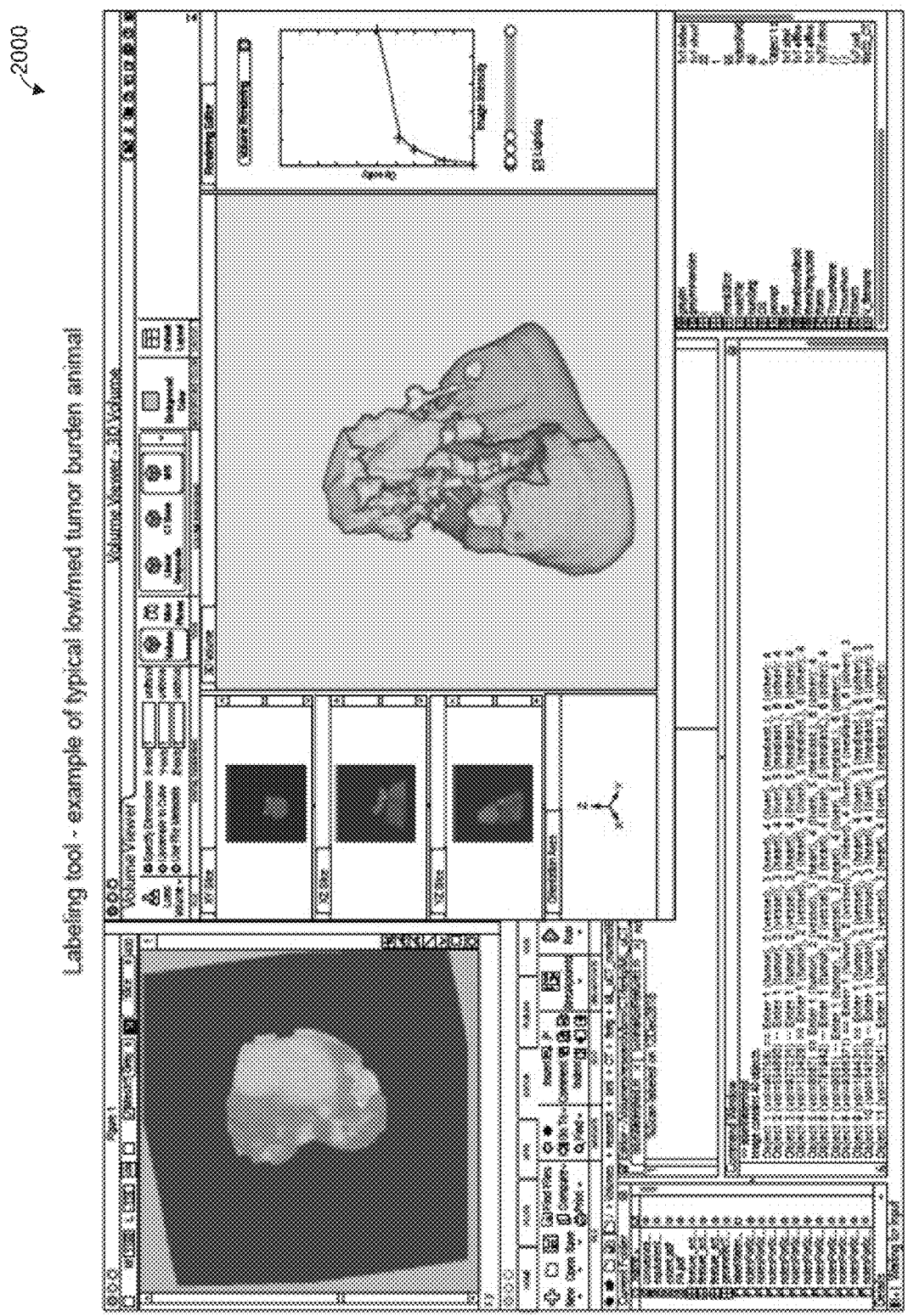
FIGS. 20A-C show example screenshots of a user interface for labeling training image objects corresponding to three-dimensional image data according to some embodiments.
Figure 20B:
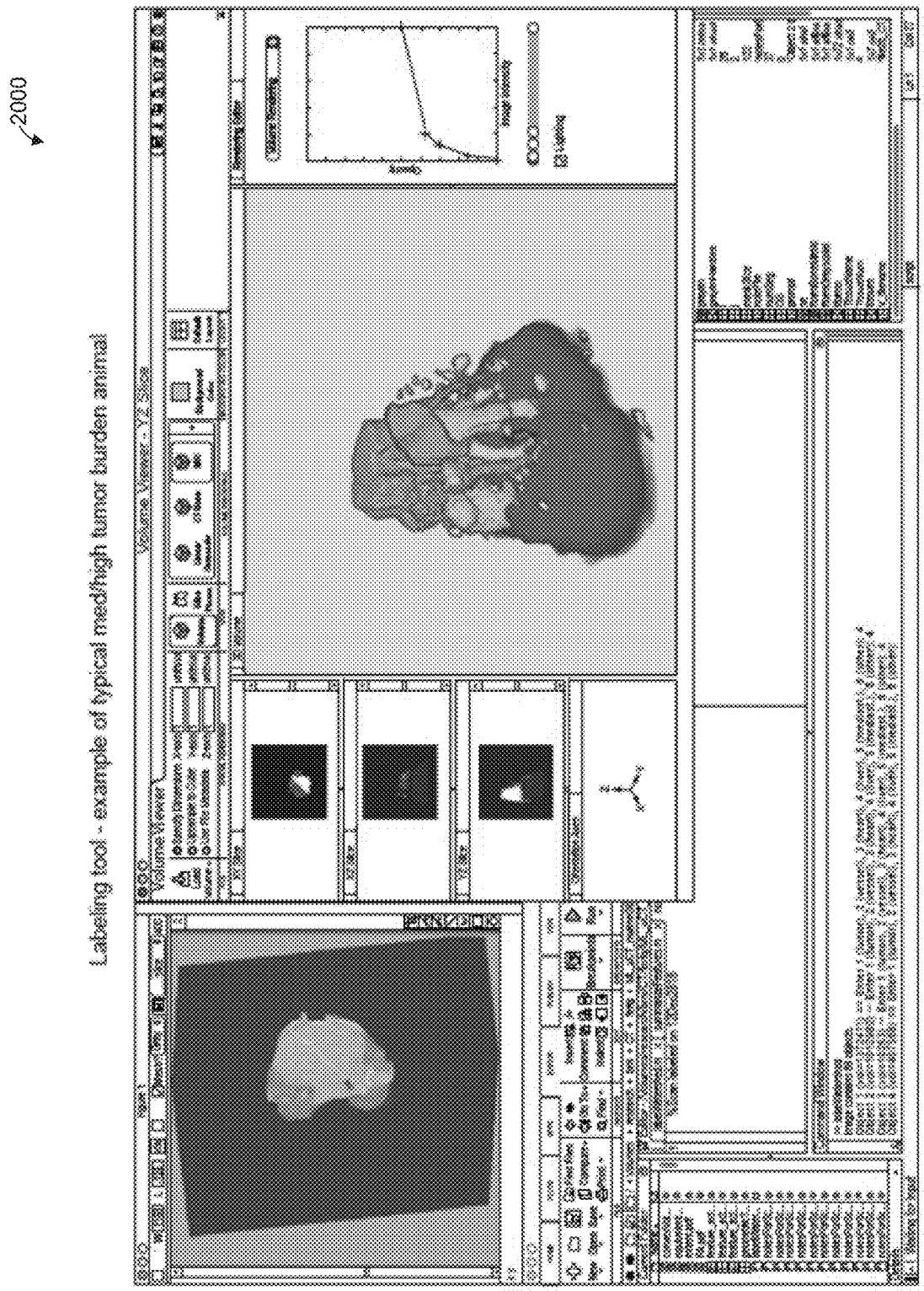
Figure 20C:
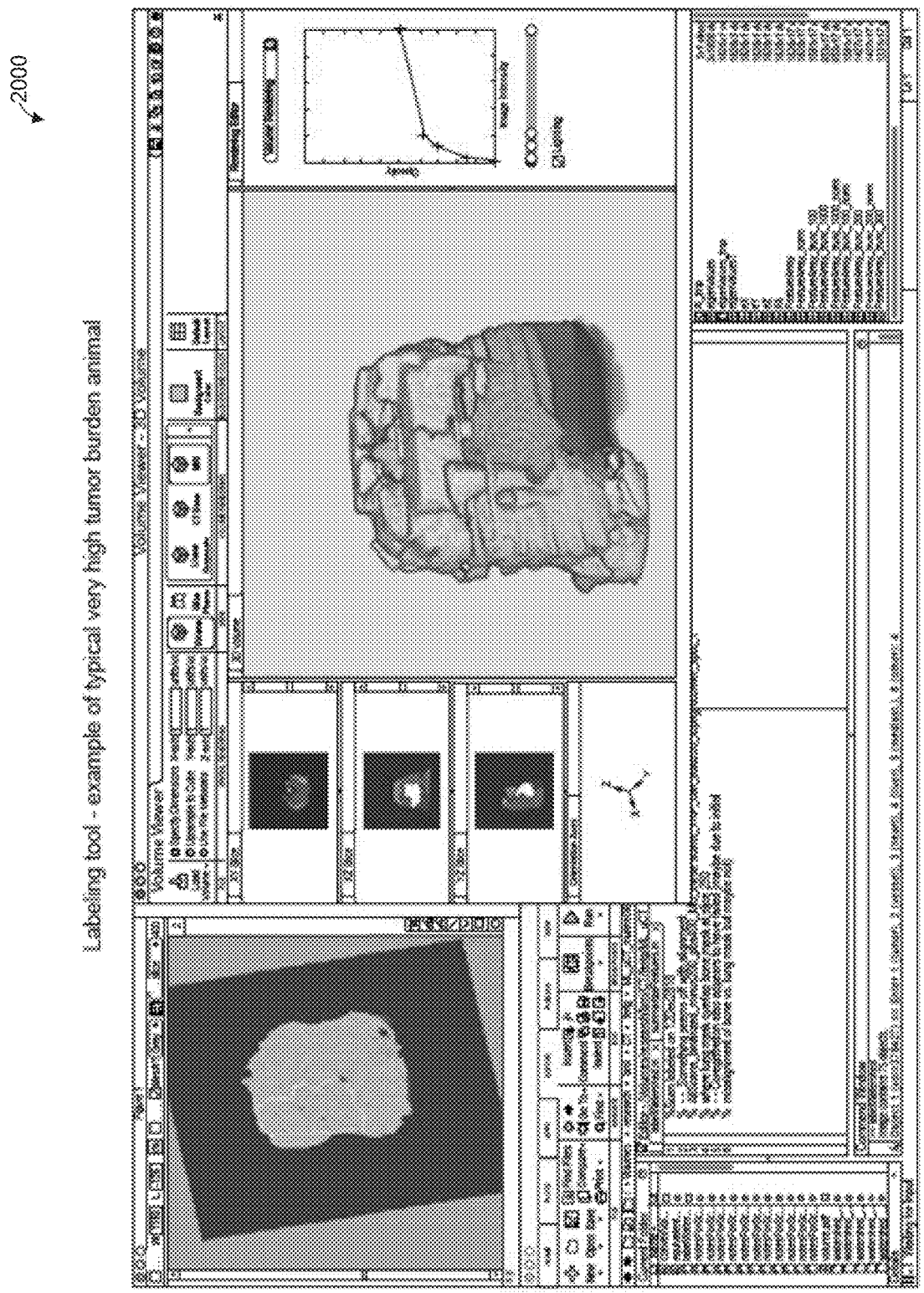

FIGS. 20A-C show example screenshots of a user interface 2000 for labeling training image objects corresponding to three-dimensional image data according to some embodiments. As described herein, a training subsystem (e.g., the training subsystem 115 of FIG. 1) may identify boundaries associated with each region represented in a training image of training data. The region may correspond to a three-dimensional image object of the training image. Each three-dimensional image object of the set can be labeled through the user interface 2000 and used as the training data for training a machine-learning model.

In the user interface 2000, each object of the set of three-dimensional image objects corresponding to the three-dimensional training image can be represented by a distinct color. A two-dimensional portion (e.g., the slice) rendered from the three-dimensional training image can be concurrently presented with the three-dimensional training image. Additionally or alternatively, the user interface 2000 can be used to scroll through an entire stack of a plurality of two-dimensional portions rendered from the three-dimensional training image. For example, the three-dimensional training image can be displayed on a first part of the user interface 2000, and a two-dimensional portion can be concurrently displayed on a second part of the user interface 2000. The two-dimensional portions may indicate regions that correspond to one or more image objects of the three-dimensional training image. For example a region corresponding to an image object can be specified (e.g., via a highlighting and/or border overlay) over a part of the two-dimensional portion. FIG. 20A shows a first screenshot of the user interface 2000, which depicts a three-dimensional training image corresponding to a subject with low tumor burden. FIG. 20B shows a second screenshot of the user interface 2000, which depicts a three-dimensional training image corresponding to a subject with medium to high tumor burden. FIG. 20C shows a third screenshot of the user interface 2000, which depicts a three-dimensional training image corresponding to a subject with a very high tumor burden.

Figure 21:
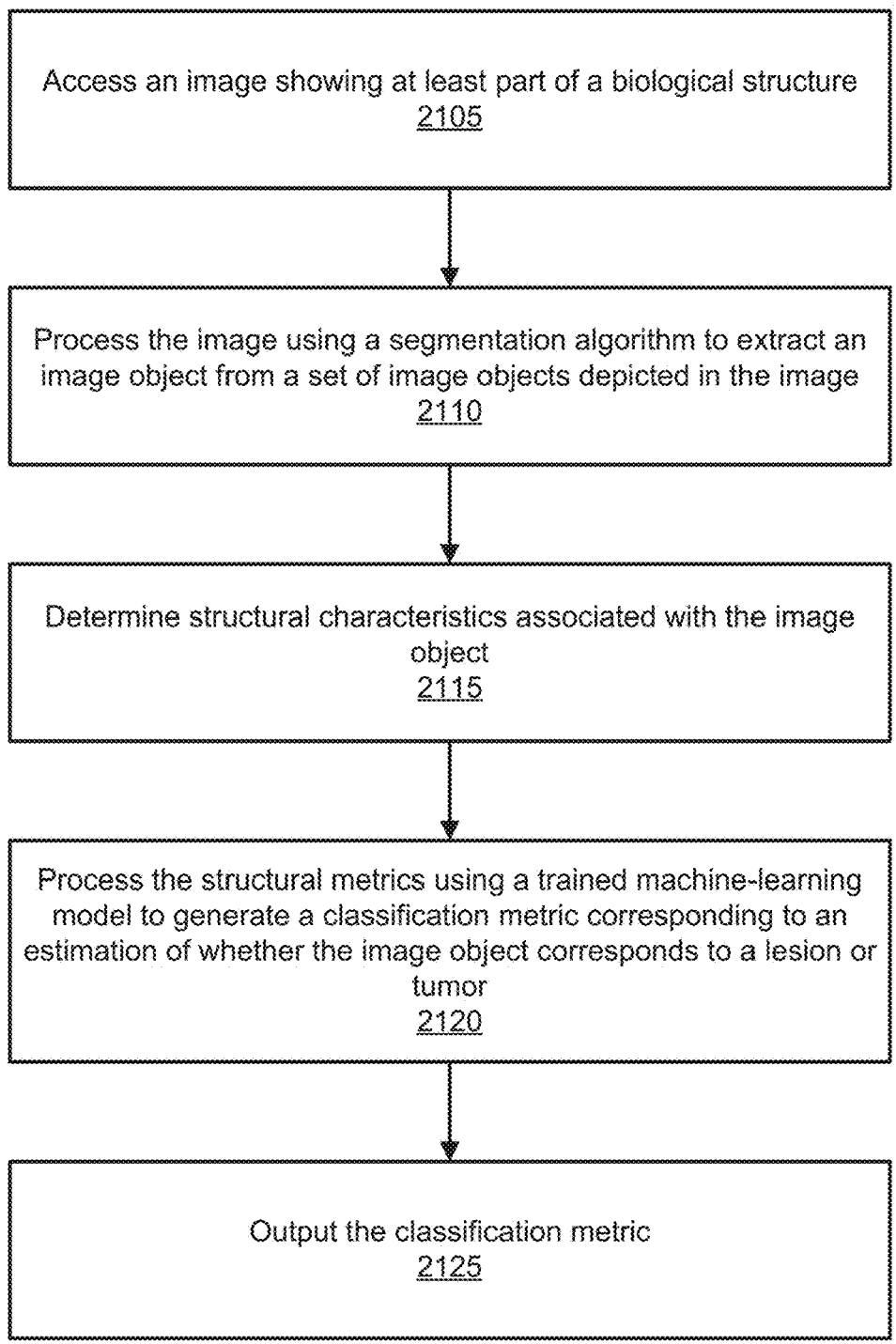
FIG. 21 illustrates a process for processing images to estimate whether at least part of a tumor is represented in the images according to some embodiments.

II.K. Example Processes for Automated Detection of Tumors Based on Image Processing FIG. 21 illustrates a process 2100 for processing images to estimate whether at least part of a tumor is represented in the images according to some embodiments. Process 2100 begins at block 2105, at which an image showing at least part of a biological structure is accessed. The biological structure may refer to one or more types tissues that are represented in the image. For example, the biological structure may include an individual organ such a lung, heart, or liver, various types of tissues (e.g., bone, blood vessels, tumors), and/or any structure that indicates changes to at least part of the biological structure (e.g., lesions).

The accessed image may include or may have been derived from data collected using and received from an imaging system. The imaging system can include a CT system, which may include a tomographic imager and/or a micro-CT component (or micro-tomosynthesis component).

At block 2110, the image is processed using a segmentation algorithm to extract an image object from a set of image objects depicted in the image. Each of the set of image object may depict a particular type of the biological structure (e.g., tissue, tumor, blood vessels). The image may be pre-processed (e.g., negative distance transform operation) to identify boundaries within the image and use the boundaries to extract the set of image objects from the image. Various segmentation algorithms can be used to extract the image objects from the registered images, including watershed segmentation algorithms, graph partitioning algorithms, and model-based segmentation algorithms.

At block 2115, structural characteristics associated with each image object is determined. The structural characteristics may refer to morphological features associated with an image object that can be measured using any techniques known to one ordinarily skilled in the art. For example, the structural characteristics may include diameter, surface area, shape, centrally convex volume, equivalent diameter, orientation, solidity, and/or volume associated with the image object. The structural characteristics can be stored in a data structure, in which an identifier may be assigned to identify the image object.

At block 2120, the structural characteristics are processed using a trained machine-learning model to generate a classification metric corresponding to an estimation of whether the image object corresponds to a lesion or tumor. The trained machine-learning model may identify whether the structural characteristics of the image object correspond to pre-identified structural characteristics associated with a particular biological structure (e.g., a tumor, a lung, blood vessels). Based on the identification, the classification metric may be generated to estimate whether the particular image corresponds to a tumor or a lesion.

At block 2125, the classification metric is output. For example, the classification metric may be locally presented or transmitted to another device. The classification metric may be output along with an identifier of the image. The classification metric can be output with a probability metric corresponding to a confidence level associated with the classification metric.

Figure 22:
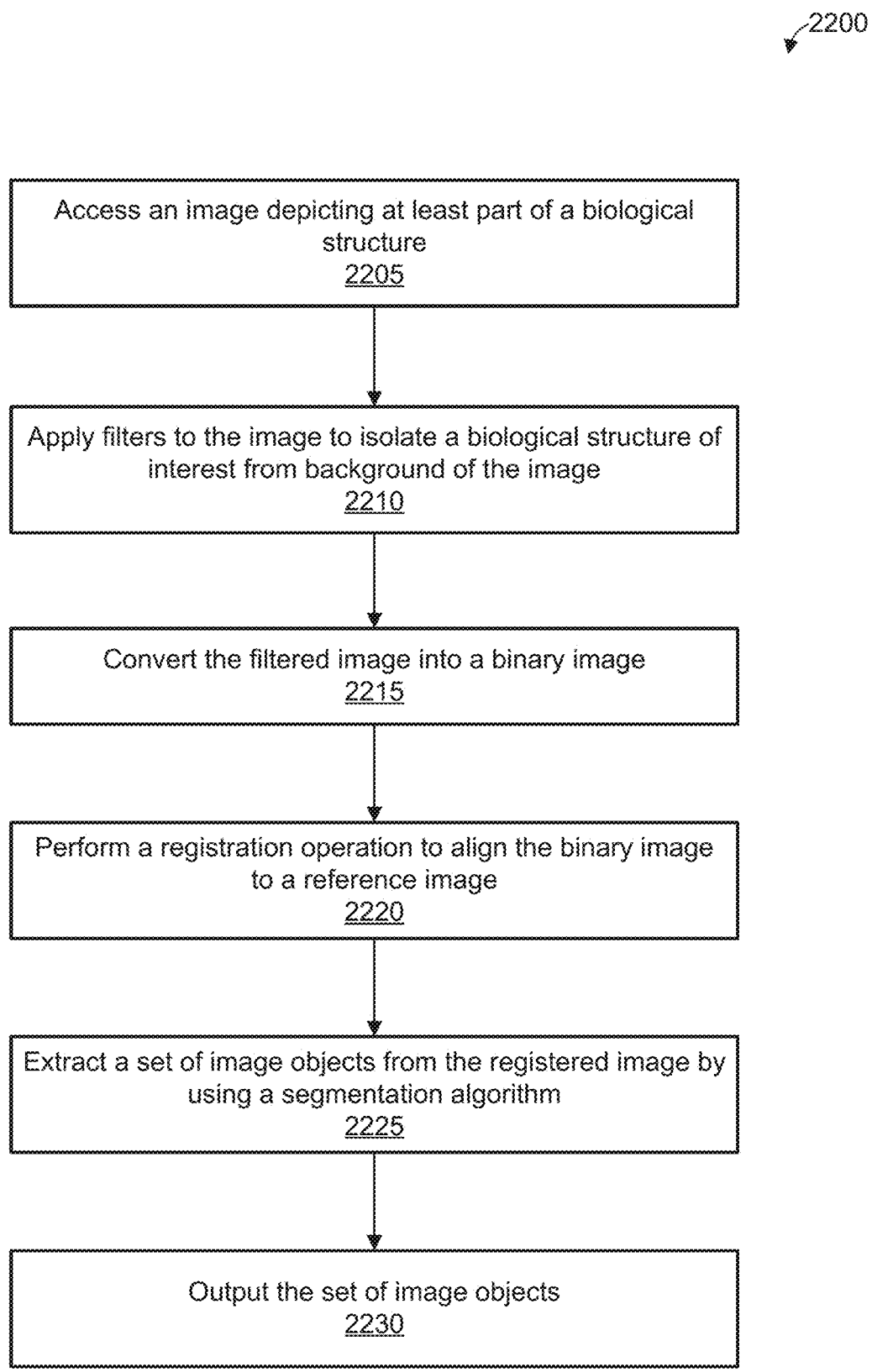
FIG. 22 illustrates a process for processing images to extract a set of image objects according to some embodiments.

FIG. 22 illustrates a process 2200 for processing images to extract a set of image objects according to some embodiments. Process 2200 begins at block 2205, at which an image showing at least part of a biological structure is accessed. The biological structure may refer to one or more types of tissues that are represented in the image. For example, the biological structure may include an individual organ such a lung, heart, or liver, various types of tissues (e.g., bone, blood vessels, tumors), and/or any structure that indicates changes to at least part of the biological structure (e.g., lesions).

The accessed image may include or may have been derived from data collected using and received from an imaging system. The imaging system can include a CT system, which may include a tomographic imager and/or a micro-CT component (or micro-tomosynthesis component).

At block 2210, filters are applied to the image to isolate a biological structure of interest from background of the image. For example, a first filter may be a lung mask that can be applied to isolate the biological structure (e.g., a lung) from the image. Background can include regions depicted in the image that exclude the biological structure of interest (e.g., bones). To apply the filters, at least part of the background can be used as boundaries surrounding the biological structure, at which the boundaries can be used to adjust the size of a region corresponding to the biological structure of interest. In some instances, a trained image pre-processing machine-learning model is used to process the accessed image to identify or isolate the ROIs, in which the ROI may include organs, tissues, tumors, and blood vessels depicted in the accessed image.

At block 2215, the filtered image is transformed into a binary image. Each pixel of at least part of the filtered image can be converted into either 0 or 1 pixel value. For example, the filtered image can be a grayscale image, which can be converted into the binary image. Binary values corresponding to a subset of pixels (e.g., 0 pixel surrounded by 1 pixels) can be converted based on a fill operation. Erosion-dilation and/or hole-filling operations can be applied to further reduce image noise of the binary image.

At block 2220, a registration operation is performed to align the binary image to a reference image. The filtered image can be registered based on a reference filter corresponding to the reference image, such that a set of transformation parameters are generated. An image warping operation can then be performed by applying the set of transformation parameters to the binary image, such that its position and orientation are adjusted. A subsequent registration operation can be performed on the warped binary image, based on a different set of transformation parameters generated based on aligning the filtered image to the reference image.

At block 2225, a segmentation algorithm is used to extract a set of image objects from the registered image. To extract the set of image objects, the registered image can be eroded to identify a set of image objects, at which seed points can be created for each image object and conditionally dilated until the registered image can be filled.

The transformed registered image can be processed by a segmentation algorithm to generate a segmented image that identifies a set of lines that can be used as boundaries for the set of image objects depicted in the registered image. Based on the boundaries, the set of image objects can be extracted from the segmented image.

At block 2230, the set of image objects is output. For example, the set of image objects may be locally presented or transmitted to another device. The set of image objects may be output along with an identifier of the image. The set of image objects may also be processed by a trained machine-learning model to generate a classification metric corresponding to an estimation of whether the image object corresponds to a lesion or tumor.

III. Additional Considerations

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes disclosed herein. Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification and variation of the concepts herein disclosed may be resorted to by those skilled in the art, and that such modifications and variations are considered to be within the scope of this invention as defined by the appended claims.

The ensuing description provides preferred exemplary embodiments only, and is not intended to limit the scope, applicability or configuration of the disclosure. Rather, the ensuing description of the preferred exemplary embodiments will provide those skilled in the art with an enabling description for implementing various embodiments. It is understood that various changes may be made in the function and arrangement of elements without departing from the spirit and scope as set forth in the appended claims.

Specific details are given in the following description to provide a thorough understanding of the embodiments. However, it will be understood that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

The invention claimed is:

1. A computer-implemented method comprising:
   accessing an image of at least part of a biological structure of a particular subject;
   processing the image using a segmentation algorithm to extract a plurality of image objects depicted in the image;
   for each image object of the plurality of image objects, performing operations comprising:
      determining one or more structural characteristics associated with the image object; and
      processing the one or more structural characteristics using a trained machine-learning model to generate estimation data corresponding to an estimation of whether the image object corresponds to a lesion or tumor associated with the biological structure, the trained machine-learning model trained with a three-dimensional model constructed from a set of training images; and
   outputting the estimation data for the particular subject.

2. The computer-implemented method of claim 1, wherein the at least part of the biological structure includes at least part of a lung.

3. The computer-implemented method of claim 1, wherein the image depicts skeletal structures surrounding the at least part of the biological structure.

4. The computer-implemented method of claim 1, wherein the image depicts a transverse plane of the at least part of the biological structure.

5. The computer-implemented method of claim 1, wherein the image includes or has been derived from image data captured using a micro-computed tomography scanner.

6. The computer-implemented method of claim 1, wherein the one or more structural characteristics identify shape, location, surface area, and/or longest diameter of the image object.

7. The computer-implemented method of claim 1, wherein a type of the biological structure includes blood vessel, lung, heart, and/or liver.

8. The computer-implemented method of claim 1, wherein the segmentation algorithm is a watershed transformation algorithm, and the trained machine-learning model is a trained support vector machine (SVM).

9. The computer-implemented method of claim 1, further comprising processing the image using an image filter to generate a filtered image that excludes one or more skeletal structures surrounding the at least part of the biological structure, wherein the filtered image is used in lieu of the image to extract the plurality of image objects.

10. The computer-implemented method of claim 1, further comprising processing the image using co-registration to align the image with a reference image, wherein the aligned image is used to in lieu of the image to extract the plurality of image objects.

11. The computer-implemented method of claim 1, further comprising:
   transforming the image into a binary image;
   converting one or more pixels of the binary image by using a fill operation; and
   performing an erosion and dilation operation to reduce image noise from the binary image.

12. The computer-implemented method of claim 1, wherein processing the image using a segmentation algorithm further comprises applying a negative distance transform function to the image to identify boundaries between two or more overlapping image objects of the plurality of image objects.

13. The computer-implemented method of claim 1, further comprising determining, based on the estimation data of the plurality of image objects, a level of tumor burden associated with the at least part of the biological structure.

14. The computer-implemented method of claim 13, wherein the level of tumor burden corresponds to a ratio between a first structural-characteristic value derived from one or more image objects of the plurality of image objects that were classified as having the tumor and a second structural-characteristic value derived from all of the plurality of image objects.

15. The computer-implemented method of claim 1, wherein:
   the one or more structural characteristics correspond to a set of structural characteristics of the image object; and
   processing the one or more structural characteristics using the trained machine-learning model further comprises selecting a subset of structural characteristics from the set of structural characteristics, wherein the subset of structural characteristics is selected by:
      generating, for a structural-characteristic category associated with a particular structural characteristic of the set of structural characteristics, a first distribution of structural-characteristic values that correspond to a first set of image objects identified as having the tumor and a second distribution of structural-characteristic values that correspond to a second set of image objects identified as not having the tumor, wherein the plurality of image objects include the first and second sets of image objects;
      identifying a statistical difference between the first distribution and the second distribution;
      determining, based on the statistical difference, that the structural-characteristic category is to be added as a category of the subset of the structural characteristics; and
      in response to determining that the structural-characteristic category is to be added as the category of the subset of the structural characteristics, adding the particular structural characteristic as an element of the subset of structural characteristics.

16. The computer-implemented method of claim 15, wherein the subset of structural characteristics identify volume, surface area, equivalent diameter, and voxel intensity of the image object.

17. The computer-implemented method of claim 1, further comprising:
preprocessing the image using a trained image-preprocessing machine-learning model to generate a filter for identifying one or more image regions that correspond to the biological structure; and
applying the filter to the image to isolate the one or more image regions, wherein the isolated image regions is used to in lieu of the image to extract the plurality of image objects.

18. A system comprising:
one or more data processors; and
a non-transitory computer readable storage medium containing instructions which, when executed on the one or more data processors, cause the one or more data processors to perform operations comprising:
accessing an image of at least part of a biological structure of a particular subject;
processing the image using a segmentation algorithm to extract a plurality of image objects depicted in the image;
for each image object of the plurality of image objects, performing operations comprising:
determining one or more structural characteristics associated with the image object; and
processing the one or more structural characteristics using a trained machine-learning model to generate estimation data corresponding to an estimation of whether the image object corresponds to a lesion or tumor associated with the biological structure, the trained machine-learning model trained with a three-dimensional model constructed from a set of training images; and
outputting the estimation data for the particular subject.

19. The system of claim 18, wherein the instructions are further configured to cause the one or more data processors to perform operations comprising:
preprocessing the image using a trained image-preprocessing machine-learning model to generate a filter for identifying one or more image regions that correspond to the biological structure; and
applying the filter to the image to isolate the one or more image regions, wherein the isolated image regions is used to in lieu of the image to extract the plurality of image objects.

20. A computer-program product tangibly embodied in a non-transitory machine-readable storage medium, including instructions configured to cause one or more data processors to perform operations comprising:
accessing an image of at least part of a biological structure of a particular subject;
processing the image using a segmentation algorithm to extract a plurality of image objects depicted in the image;
for each image object of the plurality of image objects, performing operations comprising:
determining one or more structural characteristics associated with the image object; and
processing the one or more structural characteristics using a trained machine-learning model to generate estimation data corresponding to an estimation of whether the image object corresponds to a lesion or tumor associated with the biological structure, the trained machine-learning model trained with a three-dimensional model constructed from a set of training images; and
outputting the estimation data for the particular subject.

21. The computer-program product of claim 20, wherein the instructions are further configured to cause the one or more data processors to perform operations comprising:
processing the image using an image filter to generate a filtered image that excludes one or more skeletal structures surrounding the at least part of the biological structure, wherein the filtered image is used in lieu of the image to extract the plurality of image objects.

22. The computer-program product of claim 20, wherein the instructions are further configured to cause the one or more data processors to perform operations comprising:
processing the image using co-registration to align the image with a reference image, wherein the aligned image is used to in lieu of the image to extract the plurality of image objects.

23. The computer-program product of claim 20, wherein the instructions are further configured to cause the one or more data processors to perform operations comprising:
preprocessing the image using a trained image-preprocessing machine-learning model to generate a filter for identifying one or more image regions that correspond to the biological structure; and
applying the filter to the image to isolate the one or more image regions, wherein the isolated image regions is used to in lieu of the image to extract the plurality of image objects.

* * * * *